US007718579B2

(12) United States Patent
Maurer

(10) Patent No.: US 7,718,579 B2
(45) Date of Patent: May 18, 2010

(54) ELECTROCHEMICAL DEBLOCKING USING A HYDRAZINE DERIVATIVE

(75) Inventor: Karl Maurer, Everett, WA (US)

(73) Assignee: CombiMatrix Corporation, Mukilteo, WA (US)

(*) Notice: Subject to any disclaimer, the term of this patent is extended or adjusted under 35 U.S.C. 154(b) by 643 days.

(21) Appl. No.: 10/940,858

(22) Filed: Sep. 13, 2004

(65) Prior Publication Data

US 2006/0054511 A1    Mar. 16, 2006

(51) Int. Cl.
*C40B 60/00* (2006.01)

(52) U.S. Cl. .............................. 506/33; 506/23; 506/3; 530/333

(58) Field of Classification Search ........................ None
See application file for complete search history.

(56) References Cited

U.S. PATENT DOCUMENTS

| 3,991,070 | A | 11/1976 | Hester | |
| 6,960,298 | B2* | 11/2005 | Krotz et al. | 210/500.35 |
| 2003/0050438 | A1* | 3/2003 | Montgomery | 530/334 |

FOREIGN PATENT DOCUMENTS

WO    WO 03/020415    *  9/2002

OTHER PUBLICATIONS

Gao et al. Surface-enhanced raman spectroscopy as a probe of electroorganic reaction pathways. 1. processes involving nitrobenzene, azobenzene, and related speces. 1988 J. Phys. Chem. 92:7122-7130.*

Glicksman. Investigation of the electrochemical characteristics of organic compounds VIII hydrazine and hydroxylamine compounds. 1961 J. Electrochemical Society. 108:922-927.*

* cited by examiner

*Primary Examiner*—Christopher Low
*Assistant Examiner*—Christopher M Gross
(74) *Attorney, Agent, or Firm*—Michael D. Vrbanac

(57) ABSTRACT

A method for electrochemical removal of acid-labile protecting groups on an electrode microarray using an organic solution is disclosed. The solution comprises a hydrazine derivative and a salt in an organic solvent. The hydrazine derivative has at least one hydrazine group having at least one hydrogen. The hydrazine derivative provides acidic reagent when an electrode is active and isolates the acidic reagent to the area around the active electrode. The salt is an organic salt or ionic liquid having a concentration sufficient to provide electrochemical conductivity under an applied voltage. During the applied voltage, acidic reagent is generated, which removes acid-labile protecting groups thereby allowing continued addition of monomers to build a custom microarray of oligonucleotides, peptides, or other polymers.

11 Claims, 9 Drawing Sheets

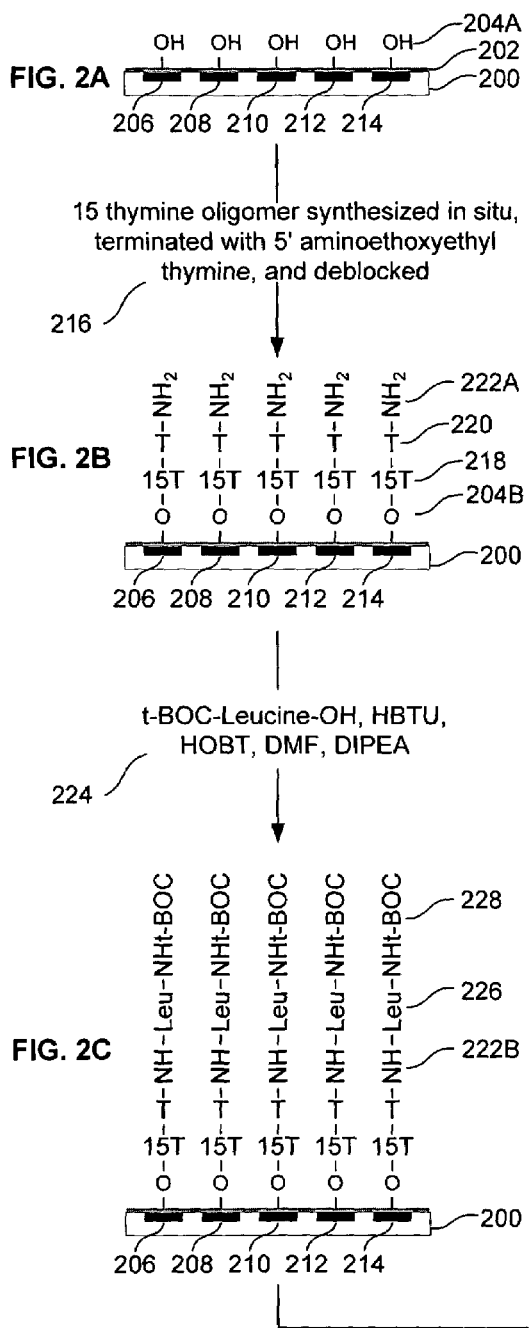
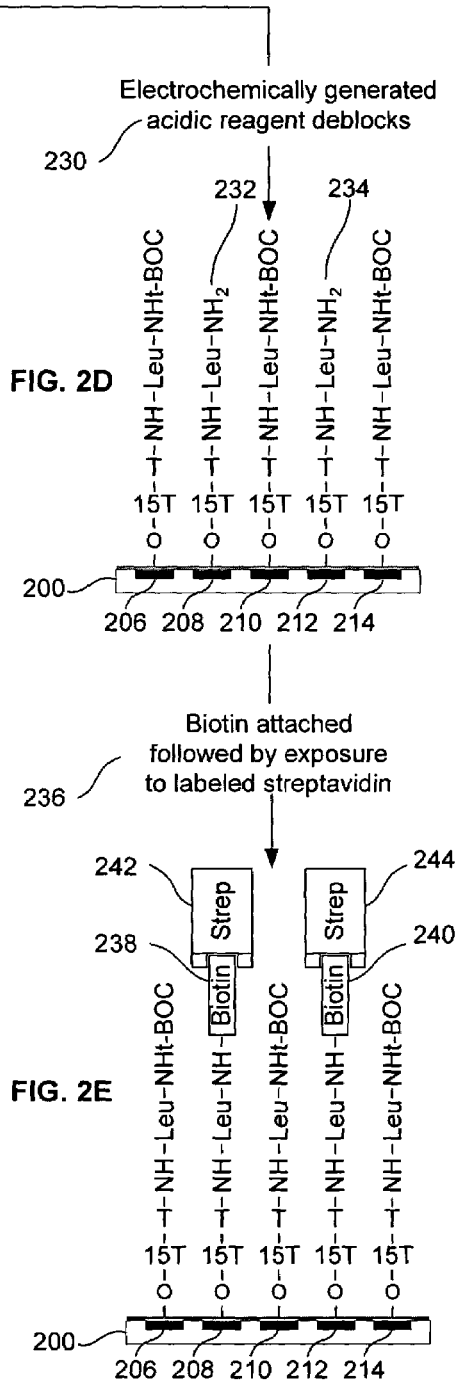

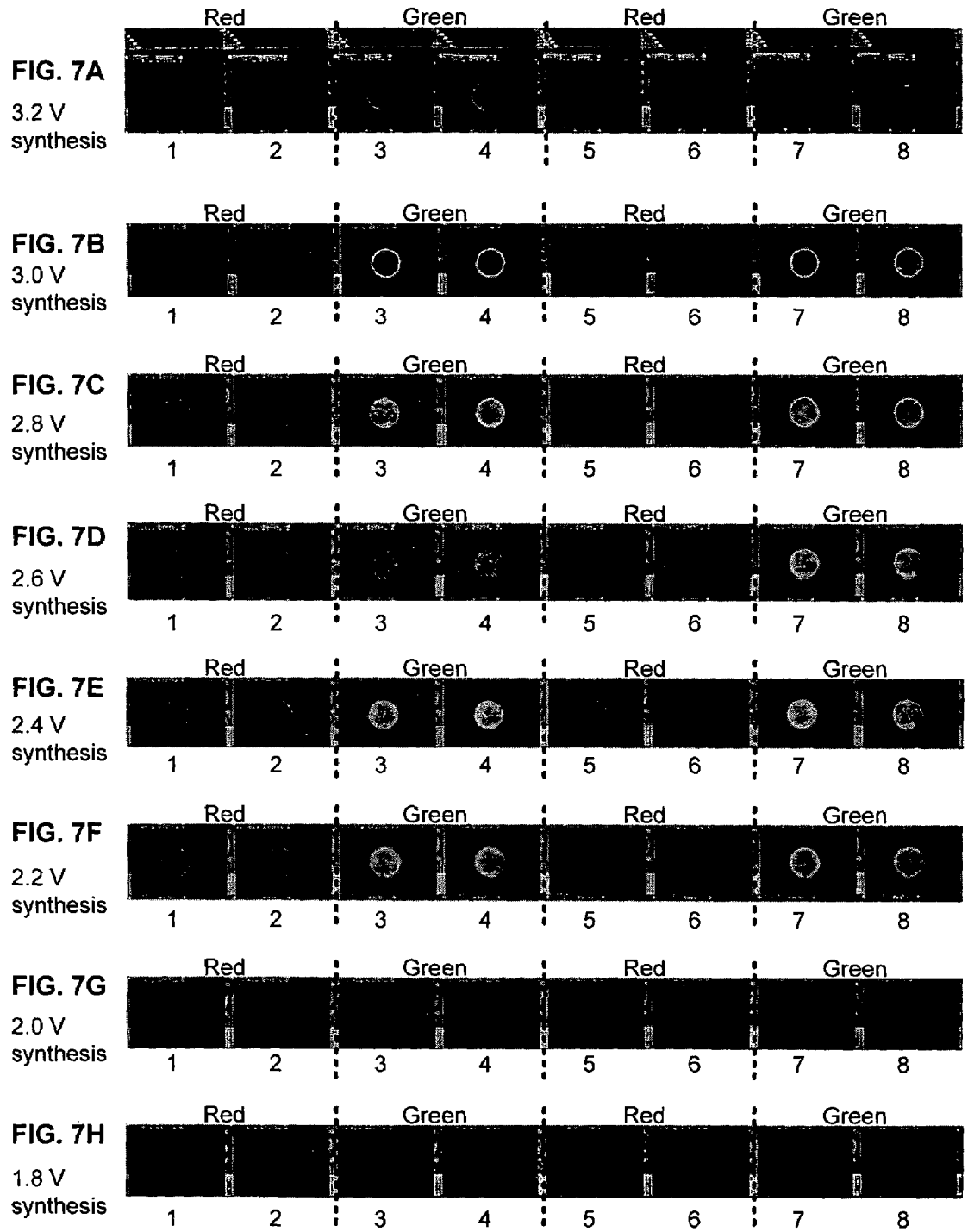

FIG. 8A  3.0 V synthesis condition using Cy 3 filter (W595)
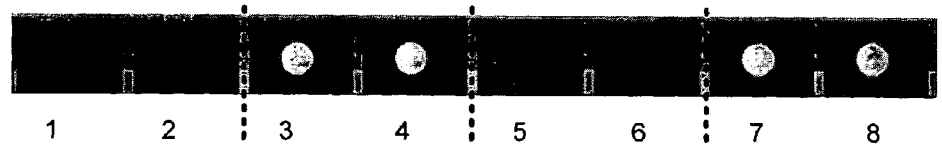
FIG. 8B  3.0 V synthesis condition using Cy 5 filter (W685)
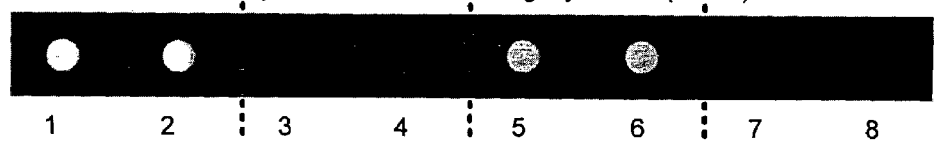

Cy 3 (wavelength 595 nm)

Cy 5 (wavelength 685 nm)

SEQUENCE LISTING

<160> NUMBER OF SEQ ID NOS: 5

<210> SEQ ID NO 1
<211> LENGTH: 15
<212> TYPE: DNA
<213> ORGANISM: artificial sequence
<220> FEATURE:
<223> OTHER INFORMATION: chemically synthesized

<400> SEQUENCE: 1
ctcgtaactc tcgcg         15

<210> SEQ ID NO 2
<211> LENGTH: 15
<212> TYPE: DNA
<213> ORGANISM: artificial sequence
<220> FEATURE:
<223> OTHER INFORMATION: chemically synthesized

<400> SEQUENCE: 2
ccggacatcc tcaag         15

<210> SEQ ID NO 3
<211> LENGTH: 5
<212> TYPE: PRT
<213> ORGANISM: artificial sequence
<220> FEATURE:
<223> OTHER INFORMATION: chemically synthesized

<400> SEQUENCE: 3

Tyr Gly Gly Phe Leu
1               5

<210> SEQ ID NO 4
<211> LENGTH: 4
<212> TYPE: PRT
<213> ORGANISM: artificial sequence
<220> FEATURE:
<223> OTHER INFORMATION: chemically synthesized

<400> SEQUENCE: 4

Gly Gly Phe Leu
1

<210> SEQ ID NO 5
<211> LENGTH: 10
<212> TYPE: DNA
<213> ORGANISM: artificial sequence
<220> FEATURE:
<223> OTHER INFORMATION: chemically synthesized

<400> SEQUENCE: 5
agctgctata         10

ELECTROCHEMICAL DEBLOCKING USING A HYDRAZINE DERIVATIVE

TECHNICAL FIELD OF THE INVENTION

The present invention relates to an electrochemical deblocking method using an organic solvent-based deblock solution for removing acid-labile protecting groups for synthesis of oligonucleotides, peptides, or other polymers on a microarray of electrodes while substantially isolating deblocking to active electrodes.

BACKGROUND OF THE INVENTION

Rapid developments in the field of DNA microarrays have lead to a number of methods for synthetic preparation of DNA. Such methods include spotting pre-synthesized oligonucleotides, photolithography using mask or maskless techniques, in situ synthesis by printing reagents, and in situ parallel synthesis on a microarray of electrodes using electrochemical deblocking of protective groups. During electrochemical deblocking, a voltage applied to an electrode generates reagent that removes the protective group thus allowing continued synthesis. A review of oligonucleotide microarray synthesis is provided by: Gao, X., Gulari, E., Zhou, X., *Biopolymers* 2004, 73, 579. The synthetic preparation of a peptide array was originally reported in 1991 using photomasking techniques. This method was extended in 2000 to include an addressable masking technique using photogenerated acids and/or in combination with photosensitizers for deblocking. Reviews of peptide microarray synthesis using photolabile deblocking are provided by: Pellois, P. J., Wang, W., Gao, X., *J. Comb. Chem.* 2000, 2, 355 and Fodor; S. P. A., Read, J. L., Pirrung, M. C., Stryer, L, Lu, A. T., Solas, D., *Science,* 1991, 251, 767. Some recent work using peptide arrays has utilized arrays produced by spotting pre-synthesized peptides or isolated proteins. A review of protein arrays is provided by: Cahill, D. J., Nordhoff, E. *Adv. Biochem. Engin/Biotechnol.* 2003, 83, 177.

During the synthesis of DNA or peptides on a microarray or other substrate, each successive addition of a respective monomer involves the removal of a protecting group to allow addition of the next monomer unit. In such a removal or deblocking step, a specific type of solution can be used that is commonly referred to as a deblocking solution, i.e., the solution deblocks the end of the chain of a DNA or peptide by removing a protective group to allow the addition of a next monomer unit. In general, protective groups can be acid-labile or base-labile, i.e., acidic conditions remove the acid-labile group and basic conditions remove the base-labile group. Additionally, some protecting groups are labile to only specific types of solvents. Alternatively, deblocking can be accomplished using photolabile-protecting groups, which can be removed by light of a certain wavelength. A review of photoremoveable protecting chemistry is provided by: Photoremovable Protecting Groups in Organic Chemistry, Pillai, V. N. R., *Synthesis* 39: 1-26 (1980). Use of protective groups is a common technique in organic synthesis and is used in the synthesis of DNA or peptides to control the addition points of successive units. Reviews of protective group chemistry are provided by: Protective Groups in Organic Synthesis, Greene, T. W. and Wuts, P. G. M., Wiley-Interscience, 1999 and Protecting Group Chemistry, Robertson, J., Oxford University Press, 2001.

Protecting groups can be removed by electrochemical methods on a microarray of electrodes as a step in the synthesis of polymers on the microarray. In this method, protecting groups are removed only at selected electrodes by applying a potential only at the selected electrodes. In order to prevent deprotection at neighboring electrodes, the method and the solution need to confine the electrochemical effects to the region immediately adjacent to the electrode undergoing deblocking. Crosstalk refers to the ability of a method and solution to substantially isolate deblocking to the active electrodes while substantially preventing deblocking outside of the active electrode area. Minimal crosstalk is desirable. Where an aqueous-based deblock solution having a buffer is used, the solution likely buffers the generation of acidic or basic species to the region near the electrode and prevents diffusion of such species to adjacent electrodes. However, in organic-based deblock solutions, the mechanism of preventing crosstalk is not necessarily well understood but may involve molecular interactions that remove or passify acidic reagent by some other species.

An aqueous-based deblock solution is disclosed in Montgomery, U.S. Pat. Nos. 6,093,302 and 6,280,595, the disclosures of which is incorporated by reference to the patents herein. In both Montgomery patents, a 0.10 M solution and a 0.05 M solution of sodium phosphate buffer are used as deblock solutions. The 0.10 M solution had a pH of 7.2, and such a deblock solution is used in examples demonstrating the effectiveness of synthesis on a microarray of electrodes and to show that crosstalk is prevented by using such a solution. Imaging of results is accomplished using a fluorescently labeled oligonucleotide probe, and such results show minimal crosstalk. The microarray system is such that synthesis, and hence molecular attachment, occurs on an overlayer attached to the electrode. In addition to the examples using sodium phosphate buffer, the use of acetate buffers, borate buffers, carbonate buffers, citrate buffers, HEPES buffers, MOPS buffers, phosphate buffers, TRIS buffers, and KI solutions is disclosed for use in deblocking. To contrast the effectiveness of the sodium phosphate at preventing crosstalk, Montgomery I and II provide an example using an organic deblocking solution disclosed in Southern, U.S. Pat. No. 5,667,667. The solution consisted of 1% triethylammonium sulfate in acetonitrile solvent. As shown in Montgomery I and II, the solution of Southern did not prevent crosstalk on the microarray of Montgomery I and II and showed considerable random deblocking around the area away from the active electrodes.

In contrast to Montgomery I and II, Southern disclosed the use of the acetonitrile deblock solution for use in an electrode array system having an arrangement such that synthesis, and hence deblocking, occurred on a surface opposite to the electrode surface. Unlike the array of single electrodes of approximately 90 micrometer diameter in Montgomery I and II, the array in Southern consists of linear electrodes ranging from 250 micrometers in width to 0.5 millimeters in width. An array having 50 to 100 micrometers width is disclosed as a future production model but no examples on such an array are provided. Southern demonstrated deblocking on a prepared glass slide held opposite to an electrode array, but such deblocking occurred in a line that was 200 micrometers to 0.5 millimeters in width. The larger size scale and electrode arrangement in Southern contrast with that disclosed in Montgomery I and II such that the organic deblock of Southern was not effective in the electrode arrangement and the smaller size scale of Montgomery I and II.

As a result of the examples provided in Montgomery I and II, the use of an organic deblock would not be encouraged for use on a microarray for synthesis of DNA, peptides or other polymeric materials. However, such a deblock may be useful for such synthesis where an aqueous media may need to be avoided. Thus, the development of a suitable organic deblock solution is desirable for synthesis conditions where there is a need to avoid an aqueous solution in the deblocking step. The present invention provides such an organic deblock solution for removing acid-labile protecting groups and substantially prevents crosstalk on an electrode microarray wherein synthesis occurs on an overlayer on the electrode microarray.

SUMMARY OF THE INVENTION

The present invention provides a method and solution for electrochemical removal of acid-labile protecting groups. Such groups are removed during an electrochemical deblocking step of a synthesis an oligonucleotide, peptide, or other polymer or synthesis of a microarray of such oligonucleotides, peptides, or other polymers. The solution comprises a hydrazine derivative and a salt in an organic solvent. The hydrazine derivative has at least one hydrazine group having at least one hydrogen. The hydrazine derivative provides acidic or basic reagent via electrochemical generation while preventing crosstalk between electrodes on an electrode microarray during electrochemical deblocking. The salt is an organic salt or ionic liquid and has a concentration sufficient to provide electrochemical activity or conductivity under an applied voltage. The applied voltage electrochemically deblocks reactive groups by removing acid-labile protecting groups. The organic solvent is any suitable solvent capable of disolving the hydrazine derivative and the salt to form the deblocking solution for electrochemical deblocking of acid-labile protecting groups.

In a preferred embodiment, the hydrazine derivative is 1,2-diphenylhydrazine. Other hydrazine chemical species can be used to practice the present invention without departing from the scope of the present invention. The hydrazine derivative has a concentration from approximately 0.01 to approximately 200 grams per liter. The hydrazine derivative provides acidic reagent under an applied voltage for deblocking and isolates electrochemically generated acidic reagent to a region surrounding an active electrode thus preventing crosstalk. The hydrazine derivative has the general formula:

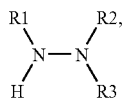

wherein R1, R2, and R3 are any chemical species that allows the hydrazine derivative to provide acidic reagent under an applied voltage for deblocking and isolate such reagent to the active electrodes. R1, R2, and R3 may be connected ring structures.

In a preferred embodiment of the present invention, the organic solvent is methylene chloride. In another preferred embodiment of the present invention, the organic solvent is acetonitrile. Other organic solvents would be acceptable alternatives without departing from the scope of the invention. In general and without being bound by theory, such other solvents may be classified as aliphatic hydrocarbons, aromatic hydrocarbons, chlorinated hydrocarbons, alcohols, glycols, glycol ethers, ethers, esters, ketones, aldehydes, amides, and amines. Solvents of other classes may be suitable and fall within the scope of the present invention. Solvent mixtures may be used and fall within the scope of the present invention.

In a preferred embodiment of the present invention, the salt is tetrabutylammonium hexafluorophosphate. Any organic salt or ionic liquid that provides electrochemical activity or conductivity to the organic solvent is suitable and falls within the scope of the present invention for deblocking acid-labile protecting groups using an electrochemical deblocking process on an electrode microarray. Without being bound by theory, such other organic salts or ionic liquids may be classified as imidazolium derivatives, pyridinium derivatives, quaternary ammonium derivatives, phosphonium derivatives, pyrrolidinium derivatives, guanidinium derivatives, uronium derivatives, and thiouronium derivatives. Other classes of salts or ionic liquids are suitable and fall within the scope of the present invention. Combinations of salts and/or ionic liquids are suitable and fall within the scope of the present invention. The salt has a concentration from approximately 0.01 to approximately 400 grams per liter.

The solution and method of the present invention may be used to remove any acid-labile protecting group. Such groups include t-butyloxycarbonyl, benzyloxycarbonyl, dimethoxytrityl, tert-butyloxycarbonyl, tert-amyloxycarbonyl, adamantyloxycarbonyl, 1-methylcyclobutyloxycarbonyl, 2-(p-biphenyl)propyl(2)oxycarbonyl, 2-(p-phenylazophenylyl)propyl(2)oxycarbonyl, alpha,alpha-dimethyl-3,5-dimethyloxybenzyloxy-carbonyl, 2-phenylpropyl(2)oxycarbonyl, 4-methyloxybenzyloxycarbonyl, benzyloxycarbonyl, furfuryloxycarbonyl, triphenylmethyl (trityl), p-toluenesulfenylaminocarbonyl, dimethylphosphinothioyl, diphenylphosphinothioyl, 2-benzoyl-1-methylvinyl, o-itrophenylsulfenyl, trimethylsilyl, triethylsilyl, t-butyldimethylsilyl, dimethoxytrityl, methoxytrityl, phthaloyl, tert-butyl ester, trimethoxytrityl, dimethyltrityl, hexadienyloxycarbonyl, and 1-naphthylidene.

The voltage in the deblocking step is approximately 0.1 volts to approximately 10 volts. The preferred voltage is approximately 1 volt to approximately 5 volts. The most preferred voltage range is approximately 1.4 volts to approximately 3.4 volts. A voltage of approximately 2.7 volts is currently the preferred voltage for most electrochemical deblocking in accordance with the present invention.

A preferred method for electrochemical removal of acid-labile protecting groups comprises applying a voltage or a current to at least one electrode of a microarray of electrodes immersed in the organic deblocking solution of the present invention. The electrode has attached thereto at least one chemical species having acid-labile protecting groups. The applied voltage electrolyzes the solution and substantially removes acid-labile protecting groups attached to the chemical species on the electrode while substantially not removing acid-labile protecting groups outside the area of the active electrode. The counter electrode may be on the microarray or separate therefrom.

BRIEF DESCRIPTION OF THE DRAWINGS

FIGS. 2A-2E are schematics of a cross-section of five electrodes of a microarray of electrodes. Specifically, FIG. 2A shows the electrodes prior to synthesis. FIG. 2B shows the electrodes having synthesized thereon a linking group with an unprotected terminal amine. FIG. 2C shows the electrodes after addition of leucine with t-BOC as the protecting group on the amine. FIG. 2D shows the electrodes after deblocking two of the electrodes thus exposing the amine groups of leucine to allow continued synthesis at the exposed amine groups. FIG. 2E shows the electrodes after attachment of biotin to the deblocked electrodes followed by exposure to Texas Red labeled streptavidin.

FIGS. 7A-7H are magnified and contrast-enhanced photographs of the top view of a section of an electrode microarray showing eight electrodes in each individual figure, wherein the deblocking voltage used for oligonucleotide synthesis is different for each figure. Electrodes 1, 2, 5, and 6 are colored red from a red fluorphore tagged onto an oligonucleotide that has been hybridized with the microarray after synthesis of the complimentary oligonucleotide on those respective electrodes. Electrodes 3, 4, 7, and 8 are colored green from a green fluorphore tagged onto an oligonucleotide that has been hybridized with the microarray after synthesis of the complimentary oligonucleotide on those respective electrodes. The deblocking solution and method of the present invention was used at each of the different voltage levels from 3.2 to 1.8 volts. The respective colors are marked and represent the lighter shades in the black and white figure.

FIGS. 8A and 8B are magnified and contrast-enhanced photographs of the top view of a section of an electrode microarray showing eight electrodes in each individual figure, wherein the deblock voltage is 3.0 volts. FIG. 8A photograph was taken through a 595 nanometer filter corresponding to Cy3 fluorophore. FIG. 8B photograph was taken through a 685 nanometer filter corresponding to Cy5 fluorophore.

FIG. 9A shows the microarray at wavelength 595 nanometers, which corresponds to Cy3 labeled DNA strands hybridized to the compliment that was synthesized at such light emitting electrodes. FIG. 9B shows the microarray at wavelength 685 nanometers, which corresponds to Cy5 labeled DNA strands hybridized to the compliment that was synthesized at such light emitting electrodes. The even rows were not active during synthesis of complimentary DNA strands. The labeled DNA strands were purchased from Integrated DNA Technologies.

DETAILED DESCRIPTION OF THE INVENTION

Figure 1:
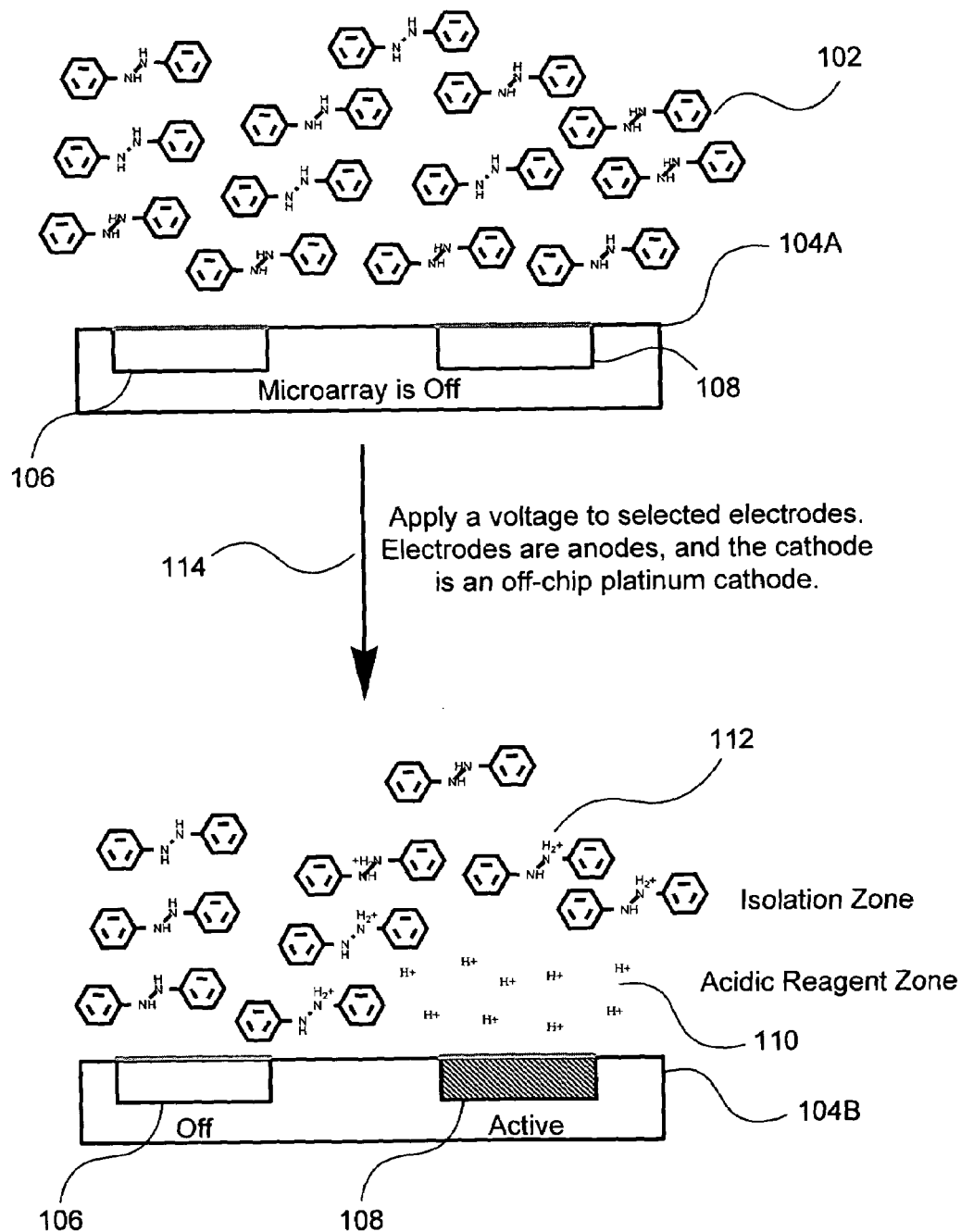
FIG. 1 is a schematic of a cross-section of two electrodes of a microarray of electrodes having a deblock solution of 1,2-diphenylhydrazine and tetrabutylammonium hexafluorophosphate in methylene chloride in contact with the microarray. The two electrodes are shown before and activation of one of the electrodes. A schematic of 1,2-diphenylhydrazine is shown as a source of acidic reagent while preventing crosstalk by scavenging acidic reagent. The counter electrode is not shown.

As used herein, the term "oligomer" means a molecule of intermediate relative molecular mass, the structure of which essentially comprises a small plurality of units derived, actually or conceptually, from molecules of lower relative molecular mass. A molecule is regarded as having an intermediate relative molecular mass if it has properties which do vary significantly with the removal of one or a few of the units. If a part or the whole of the molecule has an intermediate relative molecular mass and essentially comprises a small plurality of units derived, actually or conceptually, from molecules of lower relative molecular mass, it may be described as oligomeric, or by oligomer used adjectivally. Oligomers are typically comprised of a monomer.

The term "co-oligomer" means an oligomer derived from more than one species of monomer. The term oligomer includes co-oligomers. As examples of oligomers, a single stranded DNA molecule consisting of deoxyadenylate (A), deoxyguanylate (G), deoxycytidylate (C), and deoxythymidylate (T) units in the following sequence, AGCTGC-TATA (SEQ ID NO: 5) is a co-oligomer, and a single stranded DNA molecule consisting of 10-T units is an oligomer; however, both are referred to as oligomers.

The term "monomer" means a molecule that can undergo polymerization thereby contributing constitutional units to the essential structure of a macromolecule such as an oligomer, co-oligomer, polymer, or co-polymer. Examples of monomers include A, C, G, T, adenylate, guanylate, cytidylate, uridylate, amino acids, vinyl chloride, and other vinyls.

The term "polymer" means a substance composed of macromolecules, which is a molecule of high relative molecular mass, the structure of which essentially comprises the multiple repetition of units derived, actually or conceptually, from molecules of low relative molecular mass. In many cases, especially for synthetic polymers, a molecule can be regarded as having a high relative molecular mass if the addition or removal of one or a few of the units has a negligible effect on the molecular or physical properties. This statement fails in the case of certain macromolecules for which the properties may be critically dependent on fine details of the molecular structure. If a part or the whole of the molecule has a high relative molecular mass and essentially comprises the multiple repetition of units derived, actually or conceptually, from molecules of low relative molecular mass, it may be described as either macromolecular or polymeric, or by polymer used adjectivally.

The term "copolymer" means a polymer derived from more than one species of monomer. Copolymers that are obtained by copolymerization of two monomer species are sometimes termed bipolymers, those obtained from three monomers terpolymers, those obtained from four monomers quaterpolymers, etc. The term polymer includes co-polymers.

Nomenclature for chemical groups mostly follows the recommendations of "The International Union for Pure and Applied Chemistry", Principles of Chemical Nomenclature: a Guide to IUPAC Recommendations, Leigh, G. J.; Favre, H. A. and Metanomski, W. V., Blackwell Science, 1998, the disclosure of which is incorporated by reference herein.

The term "alkyl" means a straight or branched chain alkyl group having a single radical and containing up to approximately 100 but preferably up to 20 carbon atoms. Examples of alkyl groups include but are not limited to the following: methyl, ethyl, n-propyl, isopropyl, n-butyl, isobutyl, sec-butyl, tert-butyl, n-pentyl, isopentyl, neopentyl, tert-pentyl, isohexyl, n-hexyl, n-heptyl, and n-octyl. A substituted alkyl has one or more hydrogen atoms substituted by other groups or one or more carbons replaced by a divalent, trivalent, or tetravalent group or atom.

The term "alkenyl" means a straight or branched chain alkyl group having a single radical, having at least one carbon-carbon double bond, and containing up to approximately 100 but preferably up to 20 carbon atoms. Examples of alkenyl groups include but are not limited to the following: vinyl, 1-propenyl, 2-butenyl, 1,3-butadienyl, 2-pentenyl, 2,4-hexadienyl, 4-(ethyl)-1,3-hexadienyl, and 2-(methyl)-3-(propyl)-1,3-butadienyl. A substituted alkenyl has one or more hydrogen atoms substituted by other groups or one or more carbons replaced by a divalent, trivalent, or tetravalent group or atom.

The term "alkynyl" means a straight or branched chain alkyl group having a single radical, having at least one carbon-carbon triple bond, and containing up to approximately 100 but preferably up to 20 carbon atoms. Examples of alkynyl groups include but are not limited to the following: ethynyl, 1-propynyl, 2-propynyl, 1-butynyl, 2-butynyl, 3-butynyl, 4-pentynyl, 5-hexynyl, 6-heptynyl, 7-octynyl, 1-methyl-2-butynyl, 2-methyl-3-pentynyl, 4-ethyl-2-pentynyl, and 5,5-methyl-1,3-hexynyl. A substituted alkynyl has one or more hydrogen atoms substituted by other groups or one or more carbons replaced by a divalent, trivalent, or tetravalent group or atom.

The term "cycloalkyl" means an alkyl group forming at least one ring, wherein the ring has approximately 3 to 14 carbon atoms. Examples of cycloalkyl groups include but are not limited to the following: cyclopropyl, cyclobutyl, cyclopentyl, and cyclohexyl. A substituted cycloalkyl has one or more hydrogen atoms substituted by other groups or one or more carbons replaced by a divalent, trivalent, or tetravalent group or atom.

The term "cycloalkenyl" means an alkenyl group forming at least one ring and having at least one carbon-carbon double bond within the ring, wherein the ring has approximately 3 to 14 carbon atoms. Examples of cycloalkenyl groups include but are not limited to the following: cyclopropenyl, cyclobutenyl, cyclopentenyl, 1,3-cyclopentadienyl, and cyclohexenyl. A substituted cycloalkenyl has one or more hydrogen atoms substituted by other groups or one or more carbons replaced by a divalent, trivalent, or tetravalent group or atom.

The term "cycloalkynyl" means an alkynyl group forming at least one ring and having at least one carbon-carbon triple bond, wherein the ring contains up to approximately 14 carbon atoms. A group forming a ring having at least one triple bond and having at least one double bond is a cycloalkynyl group. An example of a cycloalkynyl group includes but is not limited to cyclooctyne. A substituted cycloalkynyl has one or more hydrogens substituted by other groups or or one or more carbons replaced by a divalent, trivalent, or tetravalent group or atom.

The term "aryl" means an aromatic ring group having mostly carbon atoms and a single radical and having approximately 4 to 50 carbon atoms. An aryl ring structure can include a ring with one or two heteroatoms. Examples of aryl groups include but are not limited to the following: phenyl, naphthyl, and anthryl. A substituted aryl has one or more hydrogens substituted by other groups or or one or more carbons replaced by a divalent, trivalent, or tetravalent group or atom.

The term "hetero," when used in the context of chemical groups, or "heteroatom" means an atom other than carbon or hydrogen. Examples of heteroatoms include but are not limited to the following: oxygen, nitrogen, phosphorous, sulfur, boron, silicon, and selenium.

The term "heterocyclic ring" means a ring structure having at least one ring having at least one heteroatom forming a part of the ring and having approximately 3 to 50 atoms connected to form the ring structure. An example of a heterocyclic ring having 6 atoms is pyridine. Additional examples of heterocyclic ring structures include but are not limited to the following aromatic structures: acridine, carbazole, chromene, imidazole, furan, indole, quinoline, and phosphinoline. Examples of heterocyclic ring structures include but are not limited to the following non-aromatic structures: aziridine, 1,3-dithiolane, 1,3-diazetidine, and 1,4,2-oxazaphospholidine. Examples of heterocyclic ring structures include but are not limited to the following fused aromatic and non-aromatic structures: 2H-furo[3,2-b]pyran, 5H-pyrido[2,3-d]-o-oxazine, 1H-pyrazolo[4,3-d]oxazole, 4H-imidazo[4,5-d]thiazole, selenazolo[5,4-f]benzothiazole, and cyclopenta[b]pyran.

The term "polycyclic" or "polycyclic group" means a carbon ring structure having more than one ring and having approximately 4 to 50 carbons forming the ring structure. Examples of polycyclic groups include but are not limited to the following: bicyclo[1.1.0]butane, bicyclo[5.2.0]nonane, and tricycle[5.3.1.1]dodecane.

The term "halo" or "halogen" means inclusively, fluorine, chlorine, bromine, or iodine.

The term "heteroatom group" means one heteroatom or more than one heteroatoms bound together and having two free valences for forming a covalent bridge between two atoms. For example, the oxy radical, —O— can form a bridge between two methyls to form $CH_3$—O—$CH_3$ (dimethyl ether) or can form a bridge between two carbons to form an epoxy such as cis or trans 2,3-epoxybutane,

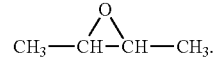

As used herein and in contrast to the normal usage, the term heteroatom group will be used to mean the replacement of groups in an alkyl, alkenyl, alkynyl, cycloalkyl, cycloalkenyl, and cycloalkynyl and not the formation of cyclic bridges, such as an epoxy, unless the term cyclic bridge is used with the term heteroatom group to denote the normal usage.

Examples of heteroatom groups, using the nomenclature for hetero bridges (such as an epoxy bridge), include but are not limited to the following: azimino (—N=N—HN—), azo (—N=N—), biimino (—NH—NH—), epidioxy (—O—O—), epidithio (—S—S—), epithio (—S—), epithioximino (—S—O—NH—), epoxy (—O—), epoxyimino (—O—

NH—), epoxynitrilo (—O—N═), epoxythio (—O—S—), epoxythioxy (—O—S—O—), furano (—C$_4$H$_2$O—), imino (—NH—), and nitrilo (—N═). Examples of heteroatom groups using the nomenclature for forming acyclic bridges include but are not limited to the following: epoxy (—O—), epithio (—S—), episeleno (—Se—), epidioxy (—O—O—), epidithio (—S—S—), lambda$^4$-sulfano (—SH$_2$—), epoxythio (—O—S—), epoxythioxy (—O—S—O—), epoxyimino (—O—NH—), epimino (—NH—), diazano (—NH—NH—), diazeno (—N═N—), triaz[1]eno (—N═N—NH—), phosphano (—PH—), stannano (—SnH$_2$—), epoxymethano (—O—CH$_2$—), epoxyethano (—O—CH$_2$—CH$_2$—), epoxyprop[1]eno

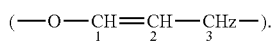

The term "bridge" means a connection between one part of a ring structure to another part of the ring structure by a hydrocarbon bridge. Examples of bridges include but are not limited to the following: methano, ethano, etheno, propano, butano, 2-buteno, and benzeno.

The term "hetero bridge" means a connection between one part of a ring structure to another part of the ring structure by one or more heteroatom groups, or a ring formed by a heterobridge connecting one part of a linear structure to another part of the linear structure, thus forming a ring.

The term "oxy" means the divalent radical —O—.
The term "oxo" means the divalent radical ═O.
The term "carbonyl" means the group

wherein the carbon has two radicals for bonding.

The term "amide" or "acylamino" means the group

wherein the nitrogen has one single radical for bonding and R is hydrogen or an unsubstituted or substituted alkyl, alkenyl, alkynyl, cycloalkyl, cycloalkenyl, cycloalkynyl, aryl, heterocyclic ring, or polycyclic group.

The term "alkoxy" means the group —O—R, wherein the oxygen has a single radical and R is hydrogen or an unsubstituted or substituted alkyl, alkenyl, alkynyl, cycloalkyl, cycloalkenyl, cycloalkynyl, aryl, heterocyclic ring, or polycyclic group. Examples of alkoxy groups where the R is an alkyl include but are not limited to the following: methoxy, ethoxy, propoxy, butoxy, pentoxy, hexoxy, heptoxy, octoxy, 1,1-dimethylethoxy, 1,1-dimethylpropoxy, 1,1-dimethylbutoxy, 1,1-dimethylpentoxy, 1-ethyl-1-methylbutoxy, 2,2-dimethylpropoxy, 2,2-dimethylbutoxy, 1-methyl-1-ethylpropoxy, 1,1-diethylpropoxy, 1,1,2-trimethylpropoxy, 1,1,2-trimethylbutoxy, 1,1,2,2-tetramethylpropoxy. Examples of alkoxy groups where the R is an alkenyl group include but are not limited to the following: ethenyloxy, 1-propenyloxy, 2-propenyloxy, 1-butenyloxy, 2-butenyloxy, 3-butenyloxy, 1-methyl-prop-2-enyloxy, 1,1-dimethyl-prop-2-enyloxy, 1,1,2-trimethyl-prop-2-enyloxy, and 1,1-dimethyl-but-2-eny-loxy, 2-ethyl-1,3-dimethyl-but-1-enyloxy. Examples of alkyloxy groups where the R is an alkynyl include but are not limited to the following: ethynyloxy, 1-propynyloxy, 2-propynyloxy, 1-butynyloxy, 2-butynyloxy, 3-butynyloxy, 1-methyl-prop-2-ynyloxy, 1,1-dimethyl-prop-2-ynyloxy, and 1,1-dimethyl-but-2-ynyloxy, 3-ethyl-3-methyl-but-1-ynyloxy. Examples of alkoxy groups where the R is an aryl group include but are not limited to the following: phenoxy, 2-naphthyloxy, and 1-anthyloxy.

The term "acyl" means the group

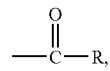

wherein the carbon has a single radical and R is hydrogen or an unsubstituted or substituted alkyl, alkenyl, alkynyl, cycloalkyl, cycloalkenyl, cycloalkynyl, aryl, heterocyclic ring, or polycyclic group. Examples of acyl groups include but are not limited to the following: acetyl, propionyl, butyryl, isobutyryl, valeryl, isovaleryl, acryloyl, propioloyl, mathacryloyl, crotonoyl, isocrotonoyl, benzoyl, and naphthoyl.

The term "acyloxy" means the group

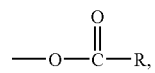

wherein the oxygen has a single radical and R is hydrogen or an unsubstituted or substituted alkyl, alkenyl, alkynyl, cycloalkyl, cycloalkenyl, cycloalkynyl, aryl, heterocyclic ring, or polycyclic group. Examples of acyloxy groups include but are not limited to the following: acetoxy, ethylcarbonyloxy, 2-propenylcarbonyloxy, pentylcarbonyloxy, 1-hexynylcarbonyloxy, benzoyloxy, cyclohexylcarbonyloxy, 2-naphthoyloxy, 3-cyclodecenylcarbonyloxy.

The term "oxycarbonyl" means the group

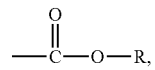

wherein the carbon has a single radical and R is hydrogen or an unsubstituted or substituted alkyl, alkenyl, alkynyl, cycloalkyl, cycloalkenyl, cycloalkynyl, aryl, heterocyclic ring, or polycyclic group. Examples of oxycarbonyl groups include but are not limited methoxycarbonyl, ethoxycarbonyl, isopropyloxycarbonyl, phenoxycarbonyl, and cyclohexyloxycarbonyl.

The term "acyloxycarbonyl" means the group

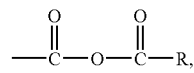

wherein the carbon has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "alkoxycarbonyloxy" means the group

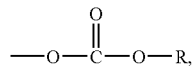

wherein the oxygen has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "carboxy" means the group —C(O)OH, wherein the carbon has a single radical.

The term "imino" or "nitrene" means the group =N—R, wherein the nitrogen has two radicals and R is hydrogen or an unsubstituted or substituted alkyl, alkenyl, alkynyl, cycloalkyl, cycloalkenyl, cycloalkynyl, aryl, heterocyclic ring, or polycyclic group.

The term "amino" means the group —NH$_2$, where the nitrogen has a single radical.

The term "secondary amino" means the group —NH—R, wherein the nitrogen has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "tertiary amino" means the group

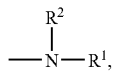

wherein the nitrogen atom has a single radical and $R_1$ and $R_2$ are independently selected from the group consisting of unsubstituted and substituted alkyl, alkenyl, alkynyl, cycloalkyl, cycloalkenyl, cycloalkynyl, aryl, heterocyclic ring, and polycyclic group.

The term "hydrazi" means the group —NH—NH—, wherein the nitrogens have single radicals bound to the same atom. The term "hydrazo" means the group —NH—NH—, wherein the nitrogen atoms have single radicals bound to the different atoms.

The term "hydrazino" means the group NH$_2$—N*H—, wherein the nitrogen (N*) has a single radical.

The term "hydrazono" means the group NH$_2$—N*=, wherein the nitrogen (N*) has two radicals.

The term "hydroxyimino" means the group HO—N*=, wherein the nitrogen (N*) has two radicals.

The term "alkoxyimino" means the group R—O—N*=, wherein the nitrogen (N*) has two radicals and R is an unsubstituted or substituted alkyl, alkenyl, alkynyl, cycloalkyl, cycloalkenyl, cycloalkynyl, aryl, heterocyclic ring, or polycyclic group.

The term "azido" means the group N$_3$—, wherein the nitrogen (N*) has one radical.

The term "azoxy" means the group —N*(O)=N*—, wherein the nitrogens each have one radical.

The term "alkazoxy" means the group R—N(O)=N*—, wherein the nitrogen (N*) has one radical and R is hydrogen or an unsubstituted or substituted alkyl, alkenyl, alkynyl, cycloalkyl, cycloalkenyl, cycloalkynyl, aryl, heterocyclic ring, or polycyclic group. Azoxybenzene is an example compound.

The term "cyano" means the group —CN. The term "isocyano" means the group —NC. The term "cyanato" means the group —OCN. The term "isocyanato" means the group —NCO. The term "fulminato" means the group —ONC. The term "thiocyanato" means the group —SCN. The term "isothiocyanato" means the group —NCS. The term "selenocyanato" means the group —SeCN. The term "isoselenocyanato" means the group —NCSe.

The term "carboxyamido" or "acylamino" means the group

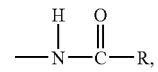

wherein the nitrogen has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "acylimino" means the group

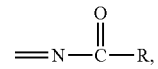

wherein the nitrogen has two radicals and R is hydrogen or an unsubstituted or substituted alkyl, alkenyl, alkynyl, cycloalkyl, cycloalkenyl, cycloalkynyl, aryl, heterocyclic ring, or polycyclic group.

The term "nitroso" means the group O=N—, wherein the nitrogen has a single radical.

The term "aminooxy" means the group —O—NH$_2$, wherein the oxygen has a single radical.

The term "carxoimidioy" means the group

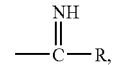

wherein the carbon has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "hydrazonoyl" means the group

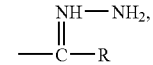

wherein the carbon has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "hydroximoyl" or "oxime" means the group

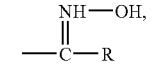

wherein the carbon has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "hydrazino" means the group

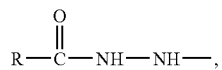

wherein each nitrogen has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "amidino" means the group

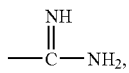

wherein the carbon has a single radical.

The term "sulfide" means the group —S—R, wherein the sulfur has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "thiol" means the group —S—, wherein the sulfur has two radicals. Hydrothiol means —SH.

The term "thioacyl" means the group —C(S)—R, wherein the carbon has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "sulfoxide" means the group

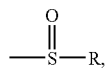

wherein the sulfur has a single radical and R is hydrogen or an unsubstituted or substituted alkyl, alkenyl, alkynyl, cycloalkyl, cycloalkenyl, cycloalkynyl, aryl, heterocyclic ring, or polycyclic group. The term "thiosulfoxide" means the substitution of sulfur for oxygen in sulfoxide; the term includes substitution for an oxygen bound between the sulfur and the R group when the first carbon of the R group has been substituted by an oxy group and when the sulfoxide is bound to a sulfur atom on another group.

The term "sulfone" means the group

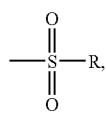

wherein the sulfur has a single radical and R is hydrogen or an unsubstituted or substituted alkyl, alkenyl, alkynyl, cycloalkyl, cycloalkenyl, cycloalkynyl, aryl, heterocyclic ring, or polycyclic group. The term "thiosulfone" means substitution of sulfur for oxygen in one or two locations in sulfone; the term includes substitution for an oxyen bound between the sulfur and the R group when the first carbon of the R group has been substituted by an oxy group and when the sulfone is bound to a sulfur atom on another group.

The term "sulfate" means the group

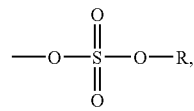

wherein the oxygen has a single radical and R is hydrogen or an unsubstituted or substituted alkyl, alkenyl, alkynyl, cycloalkyl, cycloalkenyl, cycloalkynyl, aryl, heterocyclic ring, or polycyclic group. The term "thiosulfate" means substitution of sulfur for oxygen in one, two, three, or four locations in sulfate.

The term "phosphoric acid ester" means the group $R_1R_2PO_4$—, wherein the oxygen has a single radical and $R_1$ is selected from the group consisting of hydrogen and unsubstituted and substituted alkyl, alkenyl, alkynyl, cycloalkyl, cycloalkenyl, cycloalkynyl, aryl, heterocyclic ring, and polycyclic group, and $R_2$ is selected from the group consisting of unsubstituted and substituted alkyl, alkenyl, alkynyl, cycloalkyl, cycloalkenyl, cycloalkynyl, aryl, heterocyclic ring, and polycyclic group.

The term "substituted" or "substitution," in the context of a chemical species, means independently selected from the group consisting of the replacement of a hydrogen on at least one carbon by a monovalent radical, the replacement of two hydrogens on at least one carbon by a divalent radical, the replacement of three hydrogens on at least one terminal carbon (methyl group) by a trivalent radical, the replacement of at least one carbon and the associated hydrogens (e.g., methylene group) by a divalent, trivalent, or tetravalent radical, and combinations thereof. Meeting valence requirements restricts substitution. Substitution occurs on alkyl, alkenyl, alkynyl, cycloalkyl, cycloalkenyl, cycloalkynyl, aryl, heterocyclic ring, and polycyclic groups, providing substituted alkyl, substituted alkenyl, substituted alkynyl, substituted cycloalkyl, substituted cycloalkenyl, substituted cycloalkynyl, substituted aryl group, substituted heterocyclic ring, and substituted polycyclic groups.

The groups that are substituted on an alkyl, alkenyl, alkynyl, cycloalkyl, cycloalkenyl, cycloalkynyl, aryl, heterocyclic ring, and polycyclic groups are independently selected from the group consisting of alkyl, alkenyl, alkynyl, cycloalkyl, cycloalkenyl, cycloalkynyl, aryl, heterocyclic ring, polycyclic group, halo, heteroatom group, oxy, oxo, carbonyl, amide, alkoxy, acyl, acyloxy, oxycarbonyl, acyloxycarbonyl, alkoxycarbonyloxy, carboxy, imino, amino, secondary amino, tertiary amino, hydrazi, hydrazino, hydrazono, hydroxyimino, azido, azoxy, alkazoxy, cyano, isocyano, cyanato, isocyanato, thiocyanato, fulminato, isothiocyanato, isoselenocyanato, selenocyanato, carboxyamido, acylimino, nitroso, aminooxy, carboximidoyl, hydrazonoyl, oxime, acylhydrazino, amidino, sulfide, thiol, sulfoxide, thiosulfoxide, sulfone, thiosulfone, sulfate, thiosulfate, hydroxyl, formyl, hydroxyperoxy, hydroperoxy, peroxy acid, carbamoyl, trimethyl silyl, nitrilo, nitro, aci-nitro, nitroso, semicarbazono, oxamoyl, pentazolyl, seleno, thiooxi, sulfamoyl, sulfenamoyl, sulfeno, sulfinamoyl, sulfino, sulfinyl, sulfo, sulfoamino, sulfonato, sulfonyl, sulfonyldioxy, hydrothiol, tetrazolyl, thiocarbamoyl, thiocarbazono, thiocarbodiazono, thiocarbonohydrazido, thiocarbonyl, thiocarboxy, thiocyanato, thioformyl, thioacyl, thiosemicarbazido, thiosulfino, thiosulfo, thioureido, thioxo, triazano, triazeno, triazinyl, trithio, trithiosulfo, sulfinimidic acid, sulfonimidic acid, sulfinohydrazonic acid, sulfonohydrazonic acid, sulfinohydroximic acid, sulfonohydroximic acid, and phosphoric acid ester, and combinations thereof.

As an example of a substitution, replacement of one hydrogen on ethane by a hydroxyl provides ethanol, and replacement of two hydogens by an oxo on the middle carbon of propane provides acetone (dimethyl ketone.) As a further example, replacement the middle carbon (the methenyl group) of propane by the oxy radical (—O—) provides dimethyl ether (CH$_3$—O—CH$_3$.) As a futher example, replacement of one hydrogen on benzene by a phenyl group provides biphenyl.

As provided above, heteroatom groups can be substituted inside an alkyl, alkenyl, or alkylnyl group for a methylene group (:CH$_2$) thus forming a linear or branched substituted structure rather than a ring or can be substituted for a methylene inside of a cycloalkyl, cycloalkenyl, or cycloalkynyl ring thus forming a heterocyclic ring. As a further example, nitrilo (—N=) can be substituted on benzene for one of the carbons and associated hydrogen to provide pyridine, or oxy can be substituted to provide pyran. As a further example of substitution, a heteroatom group such as an oxy group (—O—) can be substituted on the ends of an alkyl such as a hexane where the free radical remaining on each oxy group is bound to a nitrogen of a hydrazine derivative thus providing the following 9-ring member structure on a hydrazine derivative:

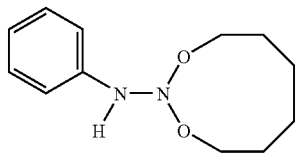

The term "unsubstituted" means that no hydrogen or carbon has been replaced on an alkyl, alkenyl, alkynyl, cycloalkyl, cycloalkenyl, cycloalkynyl, or aryl group.

The present invention provides an electrochemical deblocking method using an organic solvent-based solution for the deblocking step in the synthesis of an oligonucleotide, a peptide, oligomer, or other polymer, or a combination microarray of small molecules (i.e., combinatorial library), where removing acid-labile protective groups by electrochemically generated acidic reagent is a step within the synthesis process. Such a solution will be referred to as a deblocking solution. Electrochemical deblocking is an electrochemical step in a synthesis process, wherein a voltage or a current is applied to any one or more of a number of electrodes on an electrode microarray to locally generate an acid or a base (depending upon whether the electrode is an anode or a cathode) that affects removal of acid-labile or base labile protecting groups protecting groups (moieties) bound to a chemical species. Preferably, such chemical species is attached to a reaction layer attached to the electrodes. Such electrodes having applied voltage or current are referred to as active electrodes and are either an anode or a cathode. Once deblocking is completed, "reactive intermediates" (that is the chemical species having a protective group removed) are exposed to another chemical moiety or monomer (or even a polymer) allowing continued synthesis to enlarge the polymer (oligonucleotide, polypeptide or other polymeric specie) at the electrodes where deblocking has occurred.

In the preferred embodiment of the present invention, the deblocking solution is comprised of a hydrazine derivative and a salt that are both dissolved in an organic solvent to form an organic solution containing the hydrazine derivative and the salt. The salt is an organic salt or ionic liquid that is soluble in the organic solvent. Without being bound by theory, the salt provides conductivity to the deblocking solution to allow electrochemical generation of acidic reagent at active electrodes thus causing the deblocking reaction. The hydrazine derivative is any hydrazine containing chemical species having at least one hydrogen attached to one of the nitrogens of a hydazine group within the hydrazine derivative. Without being bound by theory, the hydrazine derivative provides acidic reagent for electrochemical deblocking and prevents diffusion of the acidic reagent away from the region surrounding active electrodes. The organic solvent is any suitable solvent capable of disolving the hydrazine derivative and the salt to form the deblocking solution for electrochemical deblocking of acid-labile protecting groups.

In the present invention, during a synthesis process on an electrode microarray, a reactive monomer species having an acid-labile protecting group is covalently attached to a reactive layer bound to the electrodes. The protective group prevents a reactive part of the monomer from reacting during synthesis to allow for different structures of polymers (i.e., compilation of monomers) to be synthesized at each electrode, even adjacent electrodes. Alternatively, the monomer species is covalently attached to a preattached chemical species on the prepared surface, such as a linker, which is a short presynthesized (in situ or otherwise) chain of oligonucleotides, peptides, or other polymer species. In either case, subsequent attachment of a monomer species, whether the same species or not, cannot occur without first removing the protecting group from the reactive part of the previously attached monomer by deblocking.

Deblocking is performed by (1) removing any synthesis solution (containing monomers) and introducing the deblock solution into the electrode microarray system to cover the microarray with the deblock solution, (2) addressing the electrodes of the microarray through a computer interface, (3) applying a voltage or current to the addressed electrodes to make such electrodes active electrodes thus causing electrochemical reagents to be generated at the electrode surface of only activated electrodes, and (4) removing the deblock solution. By "addressing" selected electrodes it means to apply voltage or current to those specific electrodes as a specific site chosen for deblocking to allow the next monomer to be bound. The counter electrode, usually the cathode, to the microarray can be on the microarray itself or can be a separate electrode.

Reagents are generated electrochemically and are capable of selectively removing protecting groups from chemical functional groups on an attached molecule. Such reagents are generated at active electrodes by applying a sufficient electrical potential (voltage or current) to the selected electrodes in the presence of the inventive deblocking formulation. The deblocking process occurs at the "active" electrodes when an acidic reagent generated by the active electrodes (electrochemically) removes the acid-labile protecting group from the attached molecules. The voltage in the deblocking step is approximately 0.1 volts to approximately 10 volts. The preferred voltage is approximately 1 volt to approximately 5 volts. The most preferred voltage is approximately 1.4 volts to approximately 3.4 volts. A voltage of approximately 2.7 volts is currently the preferred voltage for most electrochemical deblocking in accordance with the present invention.

The present invention is exemplified with regard to the electrochemical deblocking step in the synthesis on an electrode microarray of molecules containing sequences of amino acids or nucleic acids but could be readily applied to the synthesis of other oligomers or polymers. Such oligomers or polymers include, for example, both linear and cyclic polymers of nucleic acids, polysaccharides, and peptides having either alpha-, beta-, or omega-amino acids, polyurethanes, polyesters, polycarbonates, polyureas, polyamides, polyethyleneimines, polyarylene sulfides, polysiloxanes, polyimides, polyacetates, or other polymers. In a preferred embodiment, the present invention is used for the deblocking step in the synthesis of polypeptides. In another preferred embodiment, the present invention is used for the deblocking step for the synthesis of oligonucleotides, including DNA. In another preferred emodiment, the present invention is used for the deblocking step for the synthesis of a microarray of small molecules, including oligonucleotides, polypeptides, and other polymers, wherein the polymer molecules can be different (from each other) at each electrode.

The term "protective groups" means materials that bind to a monomer, a linker molecule, or a pre-formed molecule to protect a reactive functionality on the monomer, linker molecule, or pre-formed molecule. Electrochemically generated reagents can remove protective groups. Protective groups that may be used in accordance with the present invention preferably include all acid-labile protecting groups. In a preferred embodiment, peptide amine groups are protected by t-butyloxycarbonyl (BOC), which is acid-labile. In another preferred emobimentment, hydroxy groups on phosphoramidites are protected by dimethoxytrityl (DMT), which is acid-labile.

Alternatively, other protecting groups can be used and fall within the scope of the present invention. For example, amino groups can be protected by acid-labile protecting groups such as tert-butyloxycarbonyl, tert-amyloxycarbonyl, adamantyloxycarbonyl, 1-methylcyclobutyloxycarbonyl, 2-(p-biphenyl)propyl(2)oxycarbonyl, 2-(p-phenylazophenylyl)propyl(2)oxycarbonyl, alpha,alpha-dimethyl-3,5-dimethyloxybenzyloxy-carbonyl, 2-phenylpropyl(2)oxycarbonyl, 4-methyloxybenzyloxycarbonyl, benzyloxycarbonyl, furfuryloxycarbonyl, triphenylmethyl (trityl), p-toluenesulfenylaminocarbonyl, dimethylphosphinothioyl, diphenylphosphinothioyl, 2-benzoyl-1-methylvinyl, o-nitrophenylsulfenyl, hexadienyloxycarbonyl, and 1-naphthylidene. As another example, acid-labile groups such as tert-butyl ester can protect carboxylic acid groups.

In a preferred embodiment of the present invention, the organic solvent is methylene chloride. In another preferred embodiment of the present invention, the organic solvent is acetonitrile. Other organic solvents would be acceptable alternatives without departing from the scope of the invention. In general and without being bound by theory, such other solvents may be classified as aliphatic hydrocarbons, aromatic hydrocarbons, chlorinated hydrocarbons, alcohols, glycols, glycol ethers, ethers, esters, ketones, aldehydes, amides, and amines. Solvents of other classes may be suitable and fall within the scope of the present invention.

The following are examples of solvents suitable to practice the present invention: 1,1,1-trichloroethane, 1,1,2-trichloro-1,2,2-trifluoroethane, 1,1,2-trichloroethane, 1,4-dichlorobenzene, 1-butanol, 1-hexene, 1-propanol, 2-(2-butoxyethoxy)ethyl acetate, 2-butoxyethanol acetate, 2-butoxyethyl acetate, 2-ethoxyethanol acetate, 2-ethoxyethanol, 2-methoxyethanol acetate, 2-methoxyethanol, 2-methylhexane, 2-nitropropane, acetic acid, acetone alcohol, acetone, acetonitrile, allyl alcohol, benzene, benzotrifluoride, benzyl chloride, biphenyl, carbon disulfide, carbon tetrachloride, chlorobenzene, chlorobromomethane, cyclodecane, cycloheptane, cyclohexane, cyclohexanol, cyclohexanone, cyclononane, cyclooctane, cyclopentane, diacetone alcohol, dibromomethane, dichlorodiphenyltrichloroethane, dichloroethene, diemthyl sulfoxide, diethanolamine, diethyl ether, diethylene glycol, dimethyl ethanolamine, dimethyl formamide, dipropylene glycol, ethanol, ethyl acetate, ethyl benzene, ethyl ether, ethyl glycol acetate, ethyl glycol, ethylbenzene, ethylene glycol, formamide, formic acid, furfural, furfuryl alcohol, heptafluorocyclopentane, heptafluoropropyl methyl ether, heptane, hexachlorocyclohexane, hexane, isoamyl alcohol, isobutyl acetate, isobutyl alcohol, isobutyl isobutyrate, isomethoxynonafluorobutane, iso-methoxynonafluorobutane, isophorone, isopropyl acetate, iso-propyl alcohol, isopropylamine-striazine, methanol, methoxy propyl acetate, methyl amyl ketone, methyl chloride, methyl chloroform, methyl ethyl ketone, methyl glycol acetate methyl isobutyl ketone, methyl propyl ketone, methylene chloride, monochlorotoluene, monothiophosphate, n-amyl alcohol, n-butyl acetate, n-butyl alcohol, n-decane, nitrobenzene, nitromethane, n-methoxynonafluorobutane, n-methylpyrrolidone, n-nonane, n-octane, n-octyl alcohol, n-butyl acetate, n-methoxynonafluorobutane, n-pentane, n-propyl acetate, n-propyl alcohol, ortho-dichlorobenzene, perchloroethene, perchloroethylene, propylene glycol diacetate, propylene glycol, pyridine, t-amyl alcohol, t-butyl alcohol, tetrachloroethylene, tetrahydrofuran, toluene, trans-1,2-dichloroethylene, trichloroethene, trichloroethylene, trichlorofluoromethane, triethanolamine, triethylene gycol, vinyl choloride, and xylene. The foregoing examples of solvents include mixtures of two or more solvents provided that the solvent is able to dissolve the hydrazine derivative and the salt to form the deblocking solution of the present invention, wherein removal of acid-labile protecting groups is accomplished in an electrochemical deblocking step.

Preferably, the salt is tetrabutylammonium hexafluorophosphate. Any organic salt or ionic liquid that provides conductivity to the organic solvent is suitable and falls within the scope of the present invention for deblocking acid-labile protecting groups using an electrochemical deblocking process on an electrode microarray. Without being bound by theory, such other organic salts or ionic liquids may be classified as imidazolium derivatives, pyridinium derivatives, quaternary ammonium derivatives, phosphonium derivatives, pyrrolidinium derivatives, guanidinium derivatives, uronium derivatives, and thiouronium derivatives.

The following is a list of examples of organic salts and ionic liquids suitable for use in the inventive formulations and processes, including, for exdample, 1,1-dibutyl-pyrrolidinium bis(trifluoromethylsulfonyl)imide, 1,1-dimethyl-pyrrolidinium tris(pentafluoroethyl)trifluorophosphate, 1,1-dipropyl-pyrrolidinium bis(trifluoromethylsulfonyl)imide, 1,2-dimethyl-3-propylimidazolium bis(trifluoromethylsulfonyl)imide, 1,2-dimethyl-3-propylimidazolium tris(trifluoromethylsulfonyl)methide, 1,3-dimethyl-imidazolium bis(pentafluoroethyl)phosphinate, 1,3-dimethyl-imidazolium methyl sulfate, 1,3-dimethyl-imidazolium trifluoromethanesulfonate, 1-benzyl-3-methyl-imidazolium hexafluoroantimonate, 1-benzyl-3-methyl-imidazolium hexafluorophosphate, 1-benzyl-3-methyl-imidazolium methylsulfate, 1-benzyl-3-methyl-imidazolium tetrafluoroborate, 1-benzyl-3-methyl-imidazolium trifluoromethanesulfonate, 1-butyl-1-methyl-pyrrolidinium bis(trifluoromethylsulfonyl)imide, 1-butyl-1-methyl-pyrrolidinium dicyanamide, 1-butyl-1-methyl-pyrrolidinium hexafluoroantimonate, 1-butyl-1-methyl-pyrrolidinium hexafluorophosphate, 1-butyl-1-methyl-pyrrolidinium methylsulfate, 1-butyl-1-methyl-pyrrolidinium tetracyanoborate, 1-butyl-1-methyl-pyrrolidinium tetrafluoroborate, 1-butyl-1-methyl-pyrrolidinium trifluoromethanesulfonate, 1-butyl-1-methyl-pyrrolidinium tris(pentafluoroethyl)trifluorophosphate, 1-butyl-2,3-dimethyl-imidazolium hexafluoroantimonate, 1-butyl-2,3-dimethyl-imidazolium hexafluorophosphate, 1-butyl-2,3-dimethyl-imidazolium methylsulfate, 1-butyl-2,3-dimethyl-imidazolium tetrafluoroborate, 1-butyl-2,3-dimethyl-imidazolium tosylate, 1-butyl-2,3-dimethyl-imidazolium trifluoromethanesulfonate, 1-butyl-3-ethyl-imidazolium trifluoromethanesulfonate, 1-butyl-3-methyl-imidazolium 2-(2-methoxyethoxy)ethyl sulfate, 1-butyl-3-methyl-imidazolium bis(trifluoromethyl)imide, 1-butyl-3-methyl-imidazolium cobalt tetracarbonyl, 1-butyl-3-methyl-imidazolium dicyanamide, 1-butyl-3-methyl-imidazolium hexafluorophosphate, 1-butyl-3-methyl-imidazolium methyl sulfate, 1-butyl-3-methyl-imidazolium octylsulfate, 1-butyl-3-methyl-imidazolium tetrafluoroborate, 1-butyl-3-methyl-imidazolium tosylate, 1-butyl-3-methyl-imidazolium trifluoroacetate, 1-butyl-3-methyl-imidazolium trifluoromethane sulfonate, 1-butyl-3-methyl-pyridinium bis(trifluormethylsulfonyl)imide, 1-butyl-4-methyl-pyridinium hexafluorophosphate, 1-butyl-4-methyl-pyridinium tetrafluoroborate, 1-butyl-imidazolium hexafluorophosphate, 1-butyl-imidazolium tetrafluoroborate, 1-butyl-imidazolium tosylate, 1-butyl-imidazolium trifluoromethanesulfonate, 1-ethyl-1-methyl-pyrrolidinium bis(trifluoromethyl)imide, 1-ethyl-1-methyl-pyrrolidinium hexafluoroantimonate, 1-ethyl-1-methyl-pyrrolidinium hexafluorophosphate, 1-ethyl-1-methyl-pyrrolidinium methylsulfate, 1-ethyl-1-methyl-pyrrolidinium tetrafluoroborate, 1-ethyl-1-methyl-pyrrolidinium trifluoromethanesulfonate, 1-ethyl-2,3-dimethyl-imidazolium hexaflluoroantimonate, 1-ethyl-2,3-dimethyl-imidazolium hexaflluorophosphate, 1-ethyl-2,3-dimethyl-imidazolium methylsulfate, 1-ethyl-2,3-dimethyl-imidazolium tetrafluoroborate, 1-ethyl-2,3-dimethyl-imidazolium tosylate, 1-ethyl-2,3-dimethyl-imidazolium trifluoromethanesulfonate, 1-ethyl-3-methyl-imidazolium bis(pentafluoroethyl)phosphinate, 1-ethyl-3-methyl-imidazolium bis(pentafluoroethylsulfonyl)imide, 1-ethyl-3-methyl-imidazolium bis(trifluoromethyl)imide, 1-ethyl-3-methyl-imidazolium bis(trifluoromethylsulfonyl)imide, 1-ethyl-3-methyl-imidazolium bis[1,2-benzenediolato(2—)—O,O']-borate, 1-ethyl-3-methyl-imidazolium bis[oxalato(2—)]-borate, 1-ethyl-3-methyl-imidazolium cobalt tetracarbonyl, 1-ethyl-3-methyl-imidazolium dicyanamide, 1-ethyl-3-methyl-imidazolium hexafluoroantimonate, 1-ethyl-3-methyl-imidazolium hexafluorophosphate, 1-ethyl-3-methyl-imidazolium nitrate, 1-ethyl-3-methyl-imidazolium tetrafluoroborate, 1-ethyl-3-methyl-imidazolium tosylate, 1-ethyl-3-methyl-imidazolium trifluoroacetate, 1-ethyl-3-methyl-imidazolium trifluoromethanesulfonate, 1-ethyl-3-methyl-imidazolium trifluoromethyltrifluoroborate, 1-hexyl-1-methyl-pyrrolidinium bis(trifluoromethylsulfonyl)imide, 1-hexyl-1-methyl-pyrrolidinium dicyanamide, 1-hexyl-2,3-dimethyl-imidazolium tetrafluoroborate, 1-hexyl-2,3-dimethyl-imidazolium trifluoromethanesulfonate, 1-hexyl-3-methyl-imidazolium bis(trifluoromethylsulfonyl)imide, 1-hexyl-3-methyl-imidazolium bis(trifluoromethylsulfonyl)methane, 1-hexyl-3-methyl-imidazolium dicyanamide, 1-hexyl-3-methyl-imidazolium hexafluoroantimonate, 1-hexyl-3-methyl-imidazolium hexafluorophosphate, 1-hexyl-3-methyl-imidazolium methylsulfate, 1-hexyl-3-methyl-imidazolium tetracyanoborate, 1-hexyl-3-methyl-imidazolium tetrafluoroborate, 1-hexyl-3-methyl-imidazolium trifluoromethanesulfonate, 1-hexyl-3-methyl-imidazolium tris(heptafluoropropyl)trifluorophosphate, 1-hexyl-3-methyl-imidazolium tris(pentafluoroethyl)trifluorophosphate, 1-hexyl-3-methyl-imidazolium tris(pentafluoroethyl)trifluorophosphate, 1-methyl-3-(3,3,4,4,5,5,6,6,7,7,8,8,8-tridecafluorooctyl)-imidazolium-hexafluorophosphate, 1-methyl-3-octyl-imidazolium tetrafluoroborate, 1-methyl-imidazolium hexafluorophosphate, 1-methyl-imidazolium tetrafluoroborate, 1-methyl-imidazolium tosylate, 1-methyl-imidazolium trifluoromethanesulfonate, 1-octadecyl-3-methyl-imidazolium bis(trifluoromethylsulfonyl)imide, 1-octadecyl-3-methyl-imidazolium hexafluorophosphate, 1-octyl-1-methyl-pyrrolidinium bis(trifluoromethylsulfonyl)imide, 1-octyl-3-methyl-imidazolium bis(trifluoromethylsulfonyl)imide, 1-octyl-3-methyl-imidazolium bis(trifluoromethylsulfonyl)methane, 1-octyl-3-methyl-imidazolium hexafluoroantimonate, 1-octyl-3-methyl-imidazolium hexafluorophosphate, 1-octyl-3-methyl-imidazolium methylsulfate, 1-octyl-3-methyl-imidazolium tetrafluoroborate, 1-octyl-3-methyl-imidazolium trifluoromethanesulfonate, 1-pentyl-3-methyl-imidazolium trifluoromethanesulfonate, 1-pentyl-3-methyl-imidazolium tris(nonafluorobutyl)trifluorophosphate, 1-pentyl-3-methyl-imidazolium tris(pentafluoroethyl)trifluorophosphate, 1-phenylpropyl-3-methyl-imidazolium hexafluoroantimonate, 1-phenylpropyl-3-methyl-imidazolium hexafluorophosphate, 1-phenylpropyl-3-methyl-imidazolium tetrafluoroborate, 1-phenylpropyl-3-methyl-imidazolium trifluoromethanesulfonate, 1-tetradecyl-3-methyl-imidazolium tetrafluoroborate, 3-ethyl-N-butyl-pyridinium hexafluoroantimonate, 3-ethyl-N-butyl-pyridinium hexafluorophosphate, 3-ethyl-N-butyl-pyridinium tetrafluoroborate, 3-ethyl-N-butyl-pyridinium trifluoromethanesulfonate, 3-methyl-1-propyl-pyridinium bis(trifluormethylsulfonyl)imide, 3-methyl-N-butyl-pyridinium hexafluoroantimonate, 3-methyl-N-butyl-pyridinium hexafluorophosphate, 3-methyl-N-butyl-pyridinium methylsulfate, 3-methyl-N-butyl-pyridinium tetrafluoroborate, 3-methyl-N-butyl-pyridinium trifluoromethanesulfonate, 4-methyl-N-butyl-pyridinium hexafluorophosphate, 4-methyl-N-butyl-pyridinium tetrafluoroborate, benzyl triphenylphosphoniumbis(trifluoromethyl)imide, bis(trifluoromethylsulfonyl)imide, bis-tetramethyl ammonium oxalate, butyl dimethyl imidazolium hexafluorophosphate, butyl methyl imidazolium hexafluorophosphate, dimethyl diethyl ammonium hydroxide, dimethyl distearyl ammonium bisulfate, dimethyl distearyl ammonium methosulfate, ethyl triphenyl phosphonium acetate, guanidinium trifluoromethanesulfonate, guanidinium tris(pentafluoroethyl) Trifluorophosphate, hexamethyl-guanidinium trifluoromethanesulfonate, hexamethyl-guanidinium tris(pentafluoroethyl) trifluorophosphate, methyl tributyl ammonium hydrogen sulfate, methyl triethyl ammonium hydroxide, methyl trioctyl ammonium bis(trifluoromethylsulfonyl)imide, N,N,N',N',N"-pentamethyl-N"-isopropyl-guanidinium trifluoromethanesulfonate, N,N,N',N',N"-pentamethyl-N"-isopropyl-guanidinium tris(pentafluoroethyl) trifluorophosphate, N,N,N',N',N"-pentamethyl-N"-propyl-guanidinium trifluoromethanesulfonate, N,N,N',N',N"-pentamethyl-N"-propyl-guanidinium tris(pentafluoroethyl) trifluorophosphate, N,N,N',N'-tetramethyl-N"-ethyl-guanidinium trifluoromethanesulfonate, N,N,N',N'-tetramethyl-N"-ethyl-guanidinium tris(pentafluoroethyl) trifluorophosphate, N-butyl-pyridinium bis(trifluoromethyl)imide, N-butyl-pyridinium hexafluoroantimonate, N-butyl-pyridinium hexafluorophosphate, N-butyl-pyridinium methylsulfate, N-butyl-pyridinium tetrafluoroborate, N-butyl-pyridinium trifluoromethanesulfonate, N-hexyl-pyridinium bis(trifluoromethylsulfonyl)imide, N-hexyl-pyridinium bis(trifluoromethylsulfonyl)methane, N-hexyl-pyridinium hexafluorophosphate, N-hexyl-pyridinium tetrafluoroborate, N-hexyl-pyridinium trifluoromethanesulfonate, N-octyl-pyridinium bis(trifluoromethylsulfonyl)imide, N-octyl-pyridinium tris (trifluoromethylsulfonyl)methane, O-ethyl-N,N,N',N'-tetramethyl-isouronium trifluoromethanesulfonate, O-ethyl-N,N,N',N'-tetramethyl-isouronium tris(pentafluoroethyl) trifluorophosphate, O-methyl-N,N,N',N'-tetramethyl-isouronium trifluoromethanesulfonate, O-methyl-N,N,N',N'-tetramethyl-isouronium tris(pentafluoroethyl) trifluorophosphate, S-ethyl-N,N,N',N'-tetramethyl Isothiouronium Trifluoromethanesulfonate, S-ethyl-N,N,N',N'-tetramethyl-isothiouronium tris(pentafluoroethyl) trifluorophosphate, S-ethyl-N,N,N',N'-tetramethylthiouronium tetrafluoroborate, tetrabutyl ammonium bis(trifluoromethyl)imide, tetrabutyl ammonium bis(trifluoromethylsulfonyl)imide, tetrabutyl ammonium borohydride, tetrabutyl ammonium hexafluorophosphate, tetrabutyl ammonium hydrogen sulfate, tetrabutyl ammonium hydroxide, tetrabutyl ammonium nitrate, tetrabutyl ammonium perchlorate, tetrabutyl ammonium sulfate, tetrabutyl ammonium tetracyanoborate, tetrabutyl ammonium tetrafluoroborate, tetrabutyl ammonium tris(pentafluoroethyl)trifluorophosphate, tetrabutyl phosphonium acetate, tetrabutyl phosphonium bis(trifluoromethyl) imide, tetrabutyl phosphonium bis[1,2-benzenediolato(2—)—O,O']-borate, tetrabutyl phosphonium bis[oxalato(2—)]-borate, tetrabutyl phosphonium Hydroxide, tetrabutyl phosphonium tetracyanoborate, tetrabutyl phosphonium tris (pentafluoroethyl)trifluorophosphate, tetraethyl ammonium bis(trifluoromethyl)imide, tetraethyl ammonium bis(trifluoromethylsulfonyl)imide, tetraethyl ammonium bis[1,2-benzenediolato(2—)—O,O']-borate, tetraethyl ammonium bis [2,2'-biphenyldiolato(2—)—O,O']-borate, tetraethyl ammonium bis[malonato(2—)]-borate, tetraethyl ammonium bis[salicylato(2—)]-borate, tetraethyl ammonium hexafluorophosphate, tetraethyl ammonium hydrogen maleate, tetraethyl ammonium hydroxide, tetraethyl ammonium tetrafluoroborate, tetraethyl ammonium tosylate, tetraethyl ammonium tris(pentafluoroethyl)trifluorophosphate, tetramethyl ammonium bis(trifluoromethyl)imide, tetramethyl ammonium bis(trifluoromethylsulfonyl)imide, tetramethyl ammonium bis[oxalato(2—)]-borate, tetramethyl ammonium bis[salicylato(2—)]borate, tetramethyl ammonium hexafluorophosphate, tetramethyl ammonium hydrogenphthalate, tetramethyl ammonium hydroxide, tetramethyl ammonium tetrafluoroborate, tetramethyl ammonium tris (pentafluoroethyl)trifluorophosphate, tetrapropyl ammonium hydroxide, tributylethyl ammonium ethylsulfate, trihexyl(tetradecyl)-phosphonium bis(2,4,4-trimethylpentyl) phosphinate, trihexyl(tetradecyl)-phosphonium bis (trifluoromethylsulfonyl)imide, trihexyl(tetradecyl)-phosphonium bis(trifluoromethylsulfonyl)methane, trihexyl (tetradecyl)-phosphonium bis[1,2-benzenediolato(2—)—O,O']-borate, trihexyl(tetradecyl)-phosphonium decanoate, trihexyl(tetradecyl)-phosphonium dicyanamide, trihexyl(tetradecyl)-phosphonium hexafluorophosphate, trihexyl(tetradecyl)-phosphonium tetracyanoborate, trihexyl(tetradecyl)-phosphonium tetrafluoroborate, trihexyl(tetradecyl)-phosphonium, tris(pentafluoroethyl)trifluorophosphate, and tri-iso-butyl(methyl)-phosphonium tosylate, and combinations thereof.

Combinations of organic salts and/or ionic liquids may be used. The preferred concentration of salt is approximately 0.01 grams per liter to approximately 400 grams per liter. The salt may be used up to the saturation point of the salt in the organic solvent. The more preferred concentration of salt is approximately 5 grams per liter to approximately 100 grams per liter. The most preferred concentration of salt is approximately 10 grams per liter to approximately 40 grams per liter.

In a preferred embodiment, the hydrazine derivative is 1,2-diphenylhydrazine. Other hydrazide chemical species can also be used. The hydrazine derivative is a chemical species having a bound hydrazine moiety and having at least one hydrogen atom attached to one of the nitrogens of one or more hydazine groups within the hydrazine moiety. The hydrazine derivative works to isolate electrochemically generated acidic reagents to a three dimensional region surrounding an active electrode. Therefore, without being bound by theory the hydrazine derivative prevents "crosstalk" or the deprotection of neighboring non-active electrode sites when such sites are not intended to be activated. Suitable hydrazine derivatives may be obtained from commercial suppliers such as Sigma-Aldrich, which lists 500 species of hydrazine derivatives in a recent catalog. Some commercially available hydrazine derivatives lack at least one hydrogen atom on a hydrazine group and thus are not suitable for the present invention. Alternatively, the hydrazine derivative can be synthesized in a custom synthesis.

Without being bound by theory, the hydrazine derivative contains at least one hydrogen atom bound to a hydrazine nitrogen (or other hetero atom) to provide a source of acidic reagent generated electrochemically. The hydrazine derivative further prevents diffusion of the acidic reagent (i.e., proton) away from the region surrounding active electrodes to prevent deblocking at locations other than the active electrode. For illustration purposes, FIG. 1 is a schematic of a cross-section of two electrodes 106, 108 of a microarray of electrodes having a deblock solution of 1,2-diphenylhydrazine 102 and tetrabutylammonium hexafluorophosphate (not shown) in methylene chloride (not shown) in contact with the electrode microarray. The two electrodes 106, 108 are shown before 104A and after 104B a voltage is applied to one of the electrodes 108. When an electrode is active 108, 1,2-diphenylhydrazine 102 provides acidic reagent, which is shown as protons 110 above the active electrode (anode) 108 while the other electrode 106 remains off. The counter electrode is not shown. Although protons 110 are shown as the acidic reagent, the protons 110 are merely to illustrate that the volume above the active electrode 108 has acidic reagent for electrochemical deblocking by removing acid-labile protecting groups. Similarly, above the active electrode 108, part of the 1,2-diphenylhydrazine is shown having an additional proton 112 to "buffer" the area away from the electrode; however, such "buffering" may occur by another chemical mechanism. Isolation of the acidic reagent by the 1,2-diphenylhydrazine to an area surrounding the active electrode is the important mechanism rather than buffering per se. As part of the overall mechanism of electrochemical generation of acidity and isolation of the acidity at the active electrodes, azobenzene may be one of the chemical intermediates involved in such mechanisms. A discussion of azobenzene electrochemistry is provided by: *Encyclopedia of Electrochemistry of the Elements, Organic Section*, Volume XIII, page 179, Executive Editor Bard, A. J., Marcel Dekker, New York, 1979.

By way of example and without limiting the choice of hydrazine-containing species having a hydrogen and being capable of forming acidic reagent in organic solution under electrochemical deblocking while preventing crosstalk, the hydrazine derivative is selected from the group consisting of:

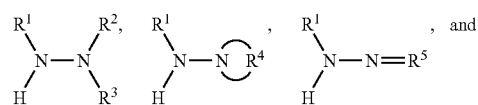

-continued

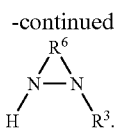

R¹, R², and R³ are independently selected from the group consisting of hydrogen, and substituted and unsubstituted alkyl, alkenyl, alkynyl, cycloalkyl, cycloalkenyl, cycloalkynyl, aryl, heterocyclic ring, and polycyclic group, and halo, amide, alkoxy, acyl, acyloxy, oxycarbonyl, acyloxycarbonyl, alkoxycarbonyloxy, carboxy, amino, secondary amino, tertiary amino, hydrazino, azido, alkazoxy, cyano, isocyano, cyanato, isocyanato, thiocyanato, fulminato, isothiocyanato, isoselenocyanato, selenocyanato, carboxyamido, acylimino, nitroso, aminooxy, carboximidoyl, hydrazonoyl, oxime, acylhydrazino, amidino, sulfide, sulfoxide, thiosulfoxide, sulfone, thiosulfone, sulfate, thiosulfate, hydroxyl, formyl, hydroxyperoxy, hydroperoxy, peroxy acid, carbamoyl, trimethyl silyl, nitro, nitroso, oxamoyl, pentazolyl, sulfamoyl, sulfenamoyl, sulfeno, sulfinamoyl, sulfino, sulfo, sulfoamino, hydrothiol, tetrazolyl, thiocarbamoyl, thiocarbazono, thiocarbodiazono, thiocarbonohydrazido, thiocarboxy, thioformyl, thioacyl, thiocyanato, thiosemicarbazido, thiosulfino, thiosulfo, thioureido, triazano, triazeno, triazinyl, trithiosulfo, sulfinimidic acid, sulfonimidic acid, sulfinohydrazonic acid, sulfonohydrazonic acid, sulfinohydroximic acid, sulfonohydroximic acid, and phosphoric acid ester.

R⁴ forms a ring incorporating one of the nitrogens of the hydrazine derivative and is selected from the group consisting of substituted and unsubstituted alkyl, alkenyl, alkynyl, cycloalkyl, cycloalkenyl, cycloalkynyl, aryl, heterocyclic ring, and polycyclic group.

R⁵ forms a double bond with one of the nitrogens of the hydrazine derivative and is preferably selected from the group consisting of substituted and unsubstituted alkyl, alkenyl, and alkynyl having a terminal group having two free radicals, and substituted and unsubstituted cycloalkyl, cycloalkenyl, heterocyclic ring, polycyclic group, and cycloalkynyl having two free radicals on one atom, and oxo, imino, hydrazono, acrylimino, diazo, hydrazono, hydroxyimino, alkoxyimino, aci-nitro, semicarbazono, and thiooxi.

R⁶ forms a ring incorporating two of the nitrogens of the hydrazine derivative and is preferably selected from the group consisting of substituted and unsubstituted alkyl, alkenyl, alkynyl, cycloalkyl, cycloalkenyl, cycloalkynyl, aryl, heterocyclic ring, and polycyclic group.

The following examples are provided merely to explain, illustrate, and clarify the present invention and not to limit the scope or application of the present invention.

EXAMPLE 1

Deblocking was accomplished during peptide synthesis by an electrochemically generated acidic reagent for the removal of the t-BOC protecting group at selected positions on an electrode microarray addressable by computer control. Use of deblocking allowed the construction of different peptide chains at different places on the microarray using commercially available t-BOC reagents as the protecting group.

In this example, the electrode microarray used was a commercial microarray, CombiMatrix CustomArray. A description of the microarray is provided by Dill et al., *Anal. Chim. Acta* 2001, 444, 69; Montgomery, U.S. Pat. No. 6,093,302, and Montgomery, U.S. Pat. No. 6,280,595. The microarray used was a semiconductor silicon chip with an array of 1024 individually serially addressable 92-micrometer diameter platinum (coated over aluminum) electrodes in a 16×64 pattern. The electrodes and surrounding structure were coated with a material to allow covalent bonding of chemical species to the coating material, that, in turn, was bound to the electrode surface. The electrodes can be set to a specified voltage via connection to a personal computer having appropriate control software. The software provided electrical control of each electrode on the microarray for the sequential synthesis of peptide chains of selected sequence, wherein each step in the synthesis of adding an amino acid moiety has a deblock step.

The microarray was prepared by synthesis of a 15-unit thymidine strand on all non-control electrodes using standard phosphoramidite chemistry. Following the deblocking of the 15$^{th}$ thymidine, a thymidine having a 5' aminoethoxyethyl modifier (Glen Research) was attached. The microarray was then fully deprotected. To couple leucine to all non-control electrode locations of the microarray, the microarray was exposed to a solution containing t-BOC protected leucine (120 milligrams, 0.52 millimoles), O-benzotriazol-1-yl-N,N,N',N'-tetramethyluronium hexafluorophosphate (190 milligrams, 0.50 millimoles)(HBTU), N-hydroxybenztriazole (67 milligrams, 0.50 millimoles)(HOBT), and diisopropylethylamine (261 microliter, 1.50 millimoles)(DIPEA) dissolved into one milliliter of N,N-dimethylformamide (DMF).

Following coupling of the leucine, the microarray was washed successively with DMF (one milliliter) and then methylene chloride (one milliliter). Following washing, the leucine-coupling step was repeated to ensure complete coverage of the electrodes with the t-BOC protected leucine. Following the second leucine couple step, the microarray was washed successively with DMF (one milliliter), methylene chloride (one milliliter), and then with ethanol to remove any residual DMF or methylene chloride. The microarray was then allowed to air dry.

Following drying, the microarray was covered with a solution of 1,2-diphenylhydrazine (200 milligrams, 1.1 millimoles) and tetrabutylammonium hexafluorophosphate (400 milligrams, 1.0 millimoles) dissolved in methylene chloride (10 milliliters). Using a computer control system, select electrodes were powered to make such electrodes the active electrodes to deblock the leucine on only the active electrodes. Deblocking removed the t-BOC protecting group from the leucine on the active electrodes. The active electrodes were held at 3.0 volts verses a platinum counter electrode for 60 seconds. After deblocking, the deblock solution was removed from the microarray. The microarray was rinsed with ethanol to remove any residual electrochemical deblocking solution and then allowed to air dry.

FIGS. 2A through 2E are schematics of a cross-section of five electrodes 206, 208, 210, 212, 214 of a microarray of electrodes 200. In FIG. 2A, the electrodes 206, 208, 210, 212, 214 are shown prior to synthesis and having a layer 202 having reactive hydroxyl groups for in situ synthesis at each electrode. Each electrode has multiple reactive hydroxyl groups that are represented by one group at each electrode. Standard synthesis 216 adds 15 consecutive thymine (T) groups through a series of addition and deblocking steps, which are followed by termination with a 5' aminoethoxyethyl modified T and deblocking. FIG. 2B shows attachment 204B of the 15T 218 terminated by the modified T 220 having an amine group 222A. Synthesis step 224 adds leucine protected by t-BOC. FIG. 2C shows attachment to amine 222B of leucine 226 having t-BOC 228 protecting group. Synthesis step 230 shows selective electrochemical deblocking using the solution and method of the present invention: 1,2-diphenylhydrazine and tetrabutylammonium hexafluorophosphate in methylene chloride. FIG. 2D shows selective deblocking at electrodes 208, 212 exposing reactive amine groups 232, 234. Synthesis step 236 shows attachment of biotin using standard chemistry followed by exposure to Texas red labeled strepavidin. FIG. 2E shows attachment of biotin 238, 240 at deblocked electrodes 208, 212 and steptavidin 242, 244 complexing with biotin 238, 240.

To attach biotin to the deblocked electrodes of the microarray, the microarray was exposed to the same solution used to attach the t-BOC protected leucine except that the biotin replaced the t-BOC protected leucine and the concentration of the components was one-half the amounts used previously. The amount of biotin in solution was 61 milligrams, 0.25 millimoles. Following attachment of the biotin, the solution was removed, and the microarray was covered by a solution of Texas Red labeled streptavidin, which will selectively complex to biotin containing electrodes while ignoring the electrodes without biotin.

Figure 3:
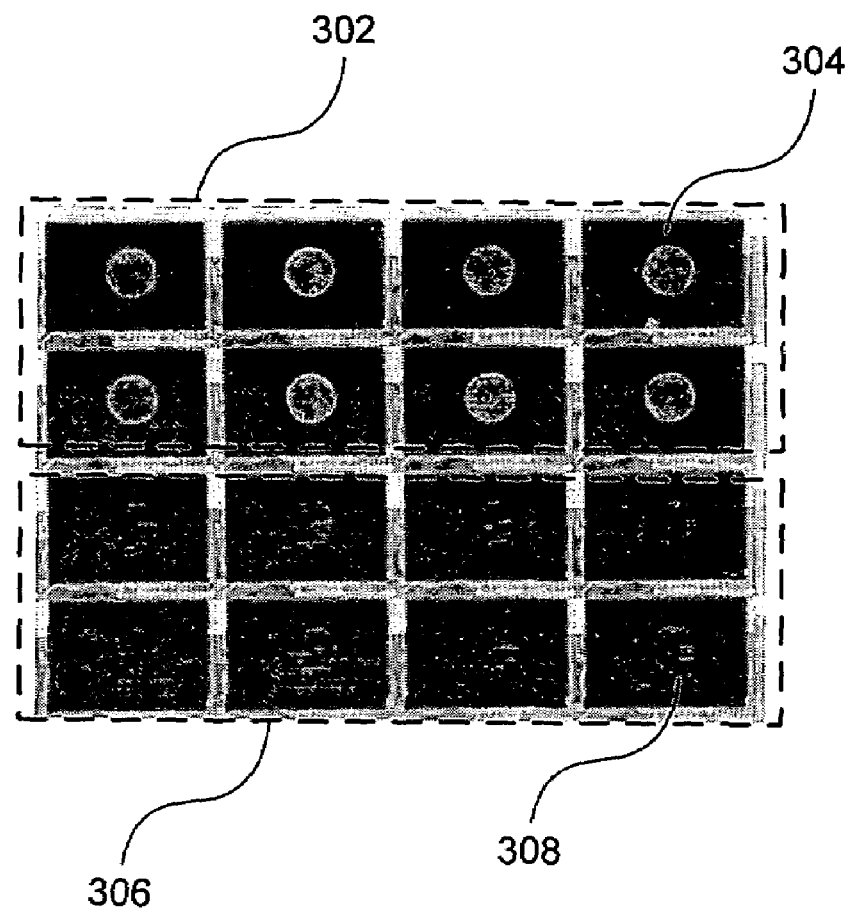
FIG. 3 is a magnified and contrast-enhanced photograph of the top view of a section of an electrode microarray showing the attachment of Texas Red labeled streptavidin to biotin to demonstrate the efficacy of the electrochemical deprotection method and solution of the present invention. The top two rows were (1) electrochemically deprotected to remove the t-BOC protecting group from leucine, (2) exposed to solution to attach Biotin to the deblocked leucine, and (3) exposed to Texas Red labeled streptavidin, which complexed with the biotin containing electrodes thus providing a fluorescent marker on such electrodes. The bottom two rows were not turned on so that the t-BOC would remain on the leucine and prevent attachment of biotin.

Image analysis was done on the microarray to view the electrodes having the Texas Red labeled strepavidin. FIG. 3 is a magnified and contrast-enhanced photograph of the top view of a section of an electrode microarray showing the attachment of Texas Red labeled streptavidin to biotin to demonstrate the efficacy of the electrochemical deprotection synthesis method and deblock solution of the present invention. Sixteen electrodes are shown. The top two rows 302 were deblocked in accordance with the present invention and example 1. The bottom two rows remained inactive during the deblocking step so that biotin was not able to attach to those electrodes. The active electrodes 302 deblocked using the deblocking solution of the present invention show the presence of the streptavidin. Individual electrode 304 shows the location of the streptavidin. In constrast, the electrodes that remained inactive 306 show no presence of streptavidin. Individual electrode 308 shows no significant adsorption of streptavidin.

EXAMPLE 2

Following the procedures for Example 1, the electrodes of a microarray had synthesized thereon t-BOC-leucine on all non-control electrodes. The t-BOC was removed electrochemically at selected electrodes in accordance with the deblock solution and method of the present invention. The synthesis process was repeated with t-BOC-phenylalanine-OH. Following this step, electrochemical deblocking was done in accordance with the deblock solution and method of the present invention. Successive synthesis was done followed by deblocking in accordance with the deblock solution and method of the present invention to build a peptide array. The synthesis process iterated through two rounds of boc-glycine-OH followed by Boc-tyrosine (t-butyl)-OH to construct an array of 5 different length amino acid chains.

Figure 4:
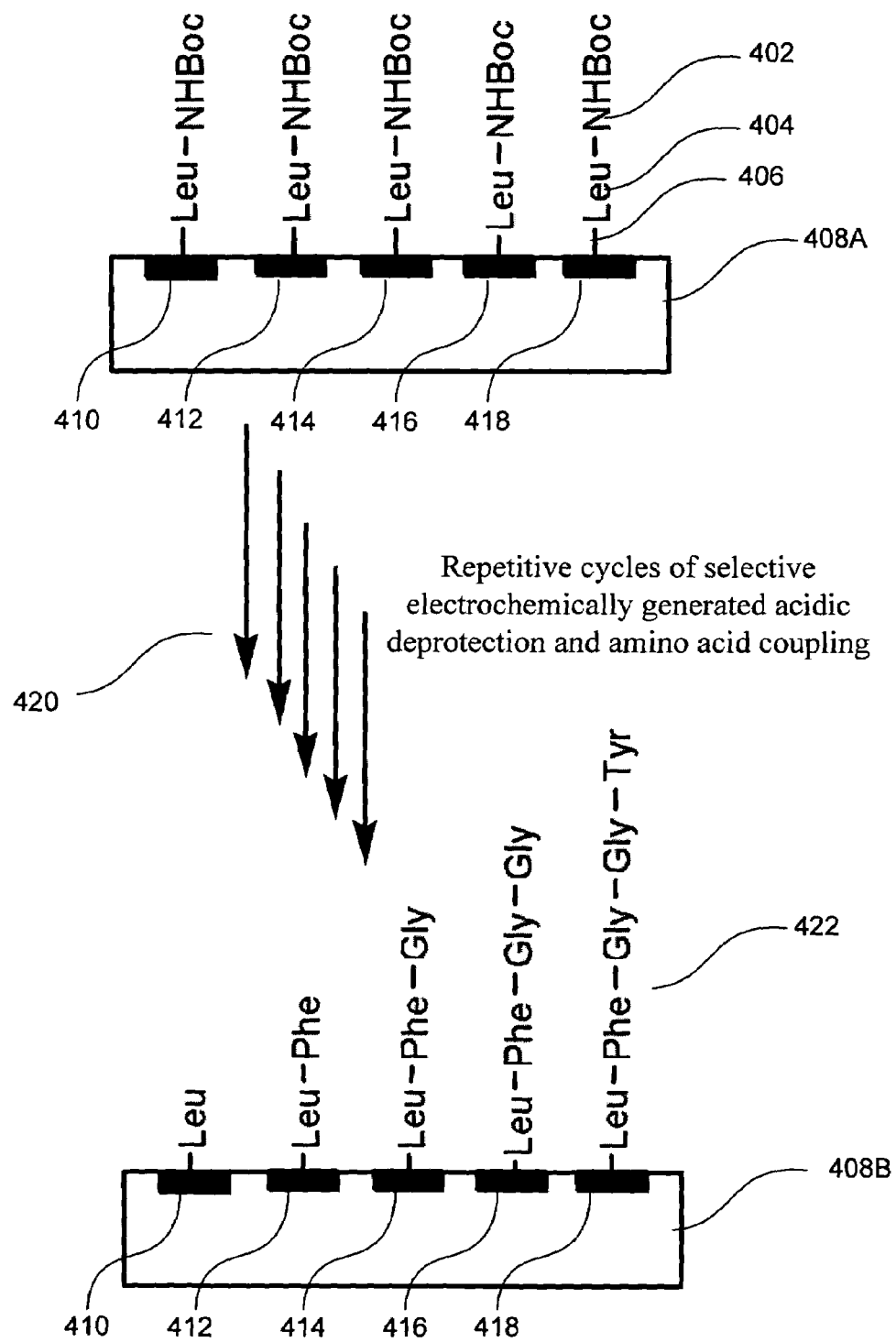
FIG. 4 is schematic of a cross-section of five electrodes of a microarray of electrodes. The five electrodes are shown before and after successive steps of addition of amino acids to a leucine base on selected electrodes. Deblocking is performed using the method of the present invention.

FIG. 4 is schematic of a cross-section 408A, 408B of five electrodes 410, 412, 414, 416, 418 of a microarray of electrodes. The five electrodes are shown before 408A and after 408B successive steps 420 of addition of amino acids to a leucine base on selected electrodes in accordance with Example 2, which uses the deblock solution and method of the present invention. Each electrode 408B is shown after a final deblocking step. The array 408B is shown containing leucine(L) 410, L-phenylalanine(F) 412, LF-glycine(G) 414, LFGG (SEQ ID NO:2) 416, and LFGG-tyrosine(Y) (SEQ ID NO:3) 418.

Once the microarray was constructed, instead of using standard electrochemical deblocking, the entire microarray was subjected to chemical deblocking using 40% trifluoroacetic acid (TFA) in methylene chloride (30 minutes) followed by 90% aqueous TFA (30 minutes). Following deblocking, the microarray was rinsed with ethanol and then blocked with acylated bovine serum albumin (ABSA) to eliminate background binding of antibody. The solution used for blocking contained two milligrams per milliliter of ABSA in 2XPBS and 0.05% TWEEN 20™. The blocking reaction was allowed to proceed for 30 minutes. After blocking, the microarray was incubated with primary anti-beta-endorphin antibody. The antibody used was Clone 3-E7 (monoclonal, mouse) and was diluted by $1/1000$ using 2XPBS having 0.05% TWEEN® 20 therein. The 2XPBS and TWEEN® 20 were purchased from Chemicon International, Inc. The anti-beta-endorphin antibody will selectively adsorb on the electrodes having leusine-phenylalanine-glycine-glycine-tyrosine synthesized thereon. Following incubation, the microarray was exposed to Cy5 labeled donkey anti-mouse antibody, which selectively adsorbs onto the anti-beta-endorphin antibody. The Cy5 labeled donkey anti-mouse antibody was purchased from Integrated DNA Technologies. Finally, the microarray was imaged on an ARRAYWORX® imager to locate the electrodes having Cy5 labeled donkey anti-mouse.

Figure 5:
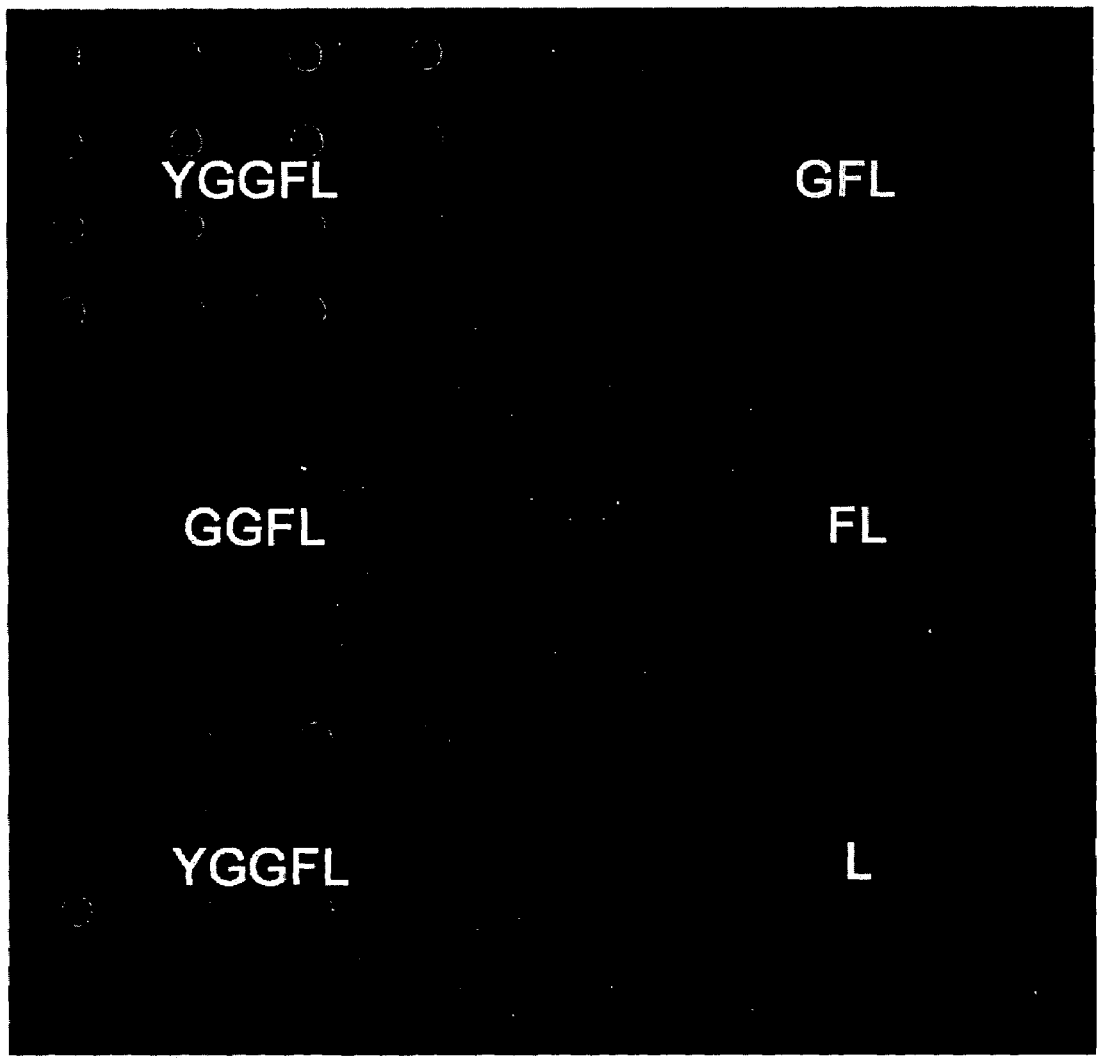
FIG. 5 is a magnified photograph of the top view of a section of an electrode microarray as prepared in FIG. 4. The bright spotted electrodes show the attachment of Cy5 labeled donkey anti-mouse antibody to anti-beta-endorphin antibody (Clone 3-E7, mouse) that is attached to the endorphin sequence tyrosine-glycine-glycine-phenylalanine-lysine (YGGFL (SEQ ID NO: 3)). Insignificant attachment is shown at electrodes having L, FL, and GFL. Trace attachment is shown at electrodes having GGFL (SEQ ID NO: 4).

FIG. 5 is a magnified and contrast-enhanced photograph of the top view of a section of an electrode microarray as prepared in FIG. 4 and in Example 2. As expected and according to the synthesis sequence and deblocking steps used in Example 2, the bright spotted electrode regions show significant attachment of Cy5 labeled donkey anti-mouse antibody to anti-beta-endorphin antibody that is attached to the endorphin sequence tyrosine-glycine-glycine-phenylalanine-leusine (YGGFL (SEQ ID NO:3). The average relative intensity at the YGGFL (SEQ ID NO:3) electrodes is 10354 units. There is a trace of binding at the GGFL (SEQ ID NO:2) containing electrodes, wherein the relative intensity is 2536 units. There is negligible binding to the remaining electrodes having the other peptides. The relative intensity for GFL, FL, and L containing electrodes is 855 units, 791 units, and 692 units respectively. The binding of the donkey anti-mouse antibody to the expected electrodes demonstrates that the deblock solution and method of the present invention was successful for use in peptide synthesis on an electrode microarray. Thus, the t-BOC protecting group on amino acids was successfully removed by the deblock solution and method, which generated sufficiently acidic conditions at the active electrodes to remove the t-BOC protecting group.

Figure 6:
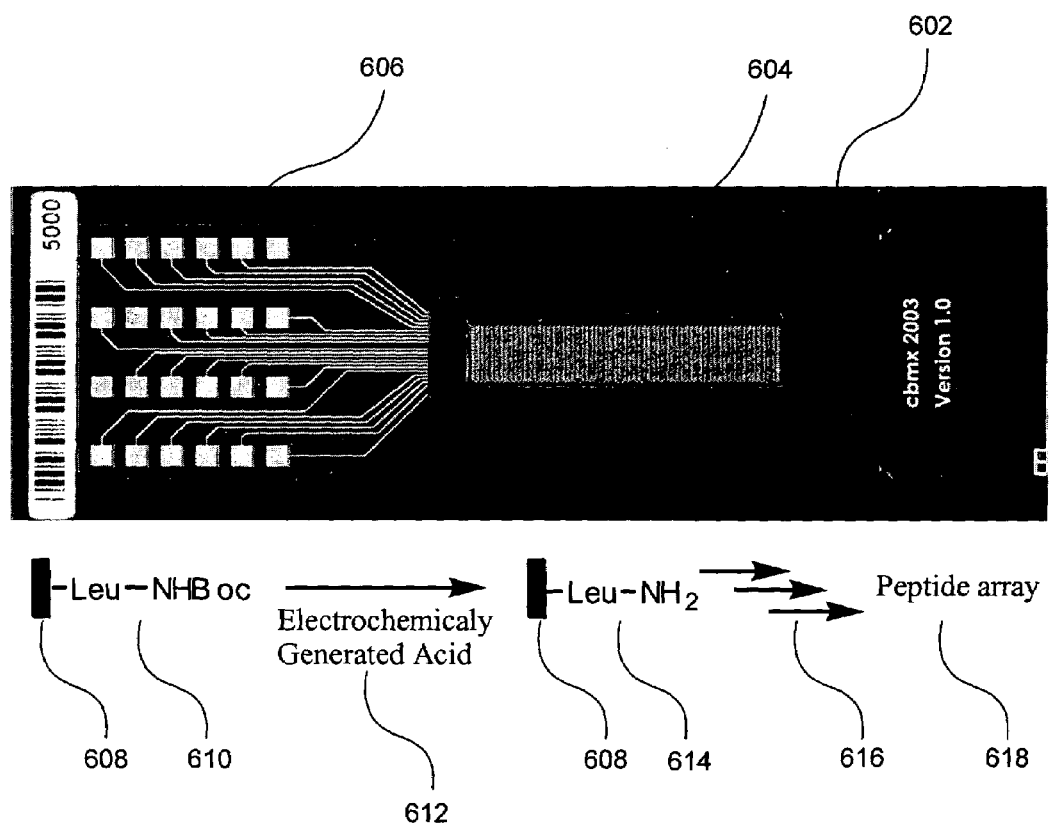
FIG. 6 is slightly magnified photograph of a top view of an electrode microarray structure, wherein synthesis of DNA, peptides, or other polymer can be performed independently on each electrode thus providing an array of different species. The electrode microarray structure is the size of a microscope slide. The electrode area by itself is approximately one square centimeter. Below the electrode microarray is a schematic of a synthesis on one electrode of a peptide array, wherein the deblock step is in accordance with the present invention of generating acidic conditions for the deblocking steps in the synthesis.

FIG. 6 is magnified photograph of a top view of an electrode microarray structure 602, wherein synthesis of DNA, peptides, or other polymer can be performed. The electrode microarray structure 602 is the size of a microscope slide. The electrode area 604 by itself is approximately one square centimeter. Electrical contacts 606 are shown for selecting which electrodes to make active during deblocking. Below the electrode microarray structure 602 is a schematic of a synthesis on one electrode of a peptide array, wherein the deblock step is in accordance with the present invention of generating acidic reagent for the deblocking steps in the synthesis of the peptide array. Cross-section of electrode 608 is shown with t-BOC protected leucine, followed by deblocking 612, providing deblocked leucine 614, followed by multiple additions of amino acids 616, and providing peptide array 618.

EXAMPLE 3

Deblocking was accomplished during DNA synthesis by an electrochemically generated acidic reagent for the removal of the dimethoxytrityl (DMT) protecting group at selected positions on an electrode microarray addressable by computer control. Use of deblocking in accordance with the present invention allowed the construction of different DNA chains at different places on the microarray using commercially available reagents having a DMT protecting group.

In this example, the electrode microarray used was a commercial microarray, CombiMatrix CustomArray™ 902. In accordance with the present invention, a deblock solution was prepared having 1,2 diphenylhydrazine (110 milliMolar) and tetrabutylammonium hexafluorophosphate (100 milliMolar) in methylene chloride solvent. The deblocking solution was used to electrochemically remove the 5' DMT of an oligonucleotides during each synthesis step in the in situ synthesis of oligonucleotides on the microarray. To test effectiveness of the deblocking solution, the protocol for DNA synthesis used standard DNA synthesis reagents purchased from Proligo (dA-CE, dC-CE, dG-CE, dT-CE) and from Burdick & Jackson (Cap A, Cap B, Oxidation-T). Absent from the normal DNA synthesis protocol was a standard deblocking agent such as Deblock-T™ from Burdick & Jackson. Instead, deblocking was done in accordance with the present invention. During DNA synthesis, deblocking using the present invention was achieved using selected electrode voltages, from 1.8 volts to 3.2 volts. At each selected voltage, the duration of applied voltage was 30 seconds for each electrochemical deblocking step using a solution in accordance with the present invention.

Two DNA strands were synthesized at selected locations on the microarray. The DNA sequence for the first DNA strand (Probe 1) was as follows: CTCGTAACTC TCGCG [SEQ ID NO 1]. Probe 1 sequence was selected such that the sequence is the compliment to a commerically available fluorfore tagged DNA strand having Cy5 as the tag. The sequence for the second DNA strand (Probe 2) was as follows: CCGGACATCC TCAAG [SEQ ID NO 2]. Similar to Probe 1, the Probe 2 sequence was selected such that the sequence is the compliment to a fluorfore tagged DNA strand having Cy3 as the tag. The tagged DNA's were purchased from Integrated DNA Technologies.

Probe 1 (P1) and Probe 2 (P2) were synthesized on the microarray at selected rows in an alternating paired pattern as follows: P1, P1, P2, P2, P1, P1, P2, P2. Thus, for each selected row, there were four electrodes having Probe 1 and four electrodes having Probe 2 synthesized thereon. During synthesis on the microarray, the voltage used for deblocking each selected row was set for that specific row. However, other rows were set at different volatages for deblocking. Between each selected row, there was one row that had no applied voltage during deblocking. Thus, the rows between each selected row did not have synthesis thereon. On row 1, the voltage used during deblocking was 3.2 volts. On row 3, the voltage used during deblocking was 3.0 volts. On subsequent odd number rows, the voltage was decrease by 0.2 volts until row 15, which had a voltage of 1.8 volts.

After synthesis, the flourophore labeled DNA strands were hybridized with the synthesized strands on the microarray. Hybridization was performed by dissolving the DNA strands in a solution of 6× SSPE, 0.1% Tween; the temperature was held at 45° C. for one hour. The chips were then washed with 6× SSPE, 0.1% Tween, and then with 2× PBS. After hybridization and washing, the microarray was imaged using an Applied Precision Instruments ArrayWorx® imaging system.

FIGS. 7A-7H are magnified and contrast-enhanced images of each row of the microarray showing eight electrodes in each individual figure. The deblocking voltage is shown for each figure, which corresponds to a different row of the microarray. Electrodes in columns 1, 2, 5, and 6 are labeled red, which correspond to the Cy5 tagged fluorophore that was hybridized to the DNA synthesized on those electrodes. Electrodes in columns 3, 4, 7, and 8 are labeled green, which corresponds to the Cy3 tagged fluorophore that was hybridized to the DNA synthesized on those electrodes. As voltage was decreased, the strength of the image on each electrode decreased. At 1.8 volts, there was minimal attachment of the fluorophores. This indicated that minimal DNA synthesis occurred at that deblocking voltage level. In addition, the decrease in DNA synthesis with deblocking voltage indicated that the deblock solution and method of the present invention was an electrochemically based mechanism.

FIG. 8A and FIG. 8B show images taken in only one channel of the imager in order to demonstrate that there was no cross-hybridization of the fluorphore tagged probes; shown by the lack of signal in different channels. For example, FIG. 8A shows the row having 3 volts used during the synthesis under a filter for light of wavelength 595 nanometers, which corresponds to the Cy3 labeled fluorophore that was expected to hybridize to Probe 2. FIG. 8B shows the row having 3 volts used during the synthesis under a filter for light of wavelength 685 nanometers, which corresponds to the Cy5 labeled fluorophore that was expected to hybridize to Probe 1. Thus, the deblocking solution and method of the present invention was successfully used in DNA synthesis on an electrode microarray as demonstrated by the hybridization of the fluorophore tagged DNA to the electrodes having synthesized the complimentary structure.

EXAMPLE 4

The experiment of Example 3 was repeated using acetonitrile instead of methylene chloride as the solvent in the deblock solution. In addition, the deblock voltage of each row was lowered. In row 1, 1.8 volts was used for deblocking. In row 3, 1.6 volts was used for deblocking. In subsequent odd numbered rows, the voltage was descreased by 0.2 volts down to 0.4 volts for row 15.

Figure 9A:
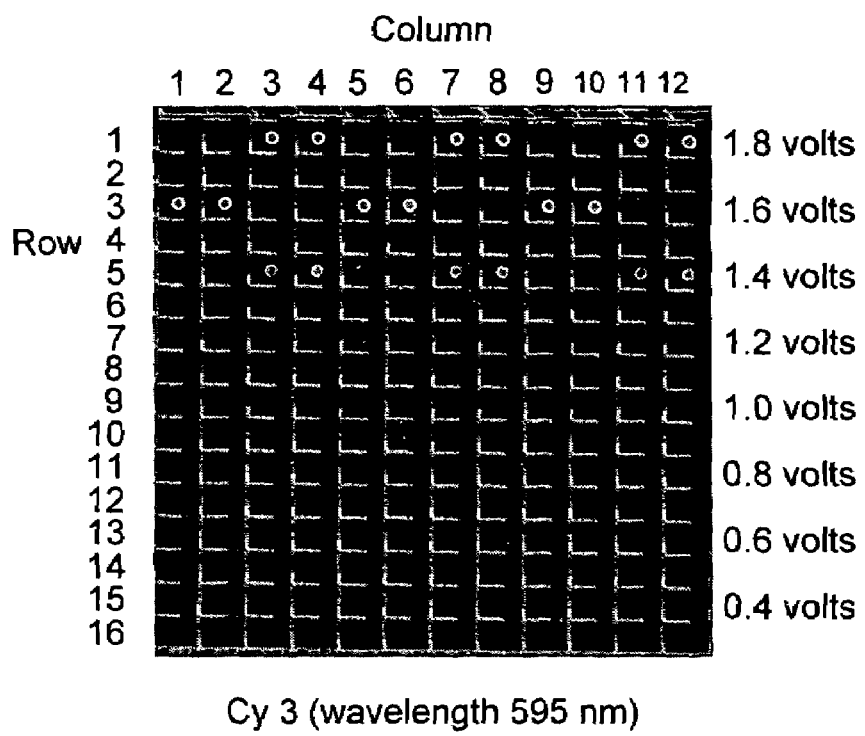
FIGS. 9A and 9B are magnified and contrast-enhanced photographs of a top view of a section of an electrode microarray showing 16 rows and 12 columns of the array.
Figure 9B:
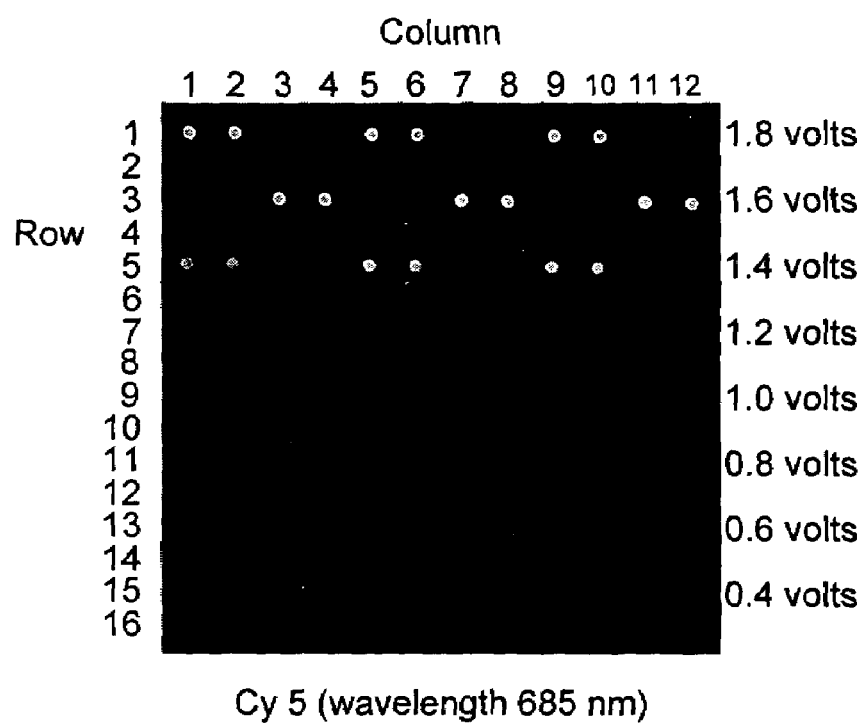

FIGS. 9A and 9B are magnified and contrast-enhanced images of a top view of a section of an electrode microarray showing 16 rows and 12 columns of the microarray. FIG. 9A shows the microarray observed to capture wavelength 595 nanometers, which corresponds to Cy3 labeled DNA strands hybridized to the compliment that was synthesized at the light emitting electrodes. FIG. 9B shows the microarray observed to capture wavelength 685 nanometers, which corresponds to Cy5 labeled DNA strands hybridized to the compliment that was synthesized at the light emitting electrodes. The even rows were not active during synthesis of complimentary DNA strands. As expected, the labeled DNA strands hybridized on the electrodes having the complimentary DNA structure. FIGS. 9A and 9B show that the deblock solution using acetonitrile as the solvent can be used in the electrochemical deblocking step during DNA synthesize on an electrode microarray. The specificity of the capture probes with respect to their target probes, even at high voltage deblocking conditions, is evidence that the acidic reagent produced at one electrode is safely contained and does not deblock neighboring electrodes, thus making the deblocking solution and method of the present invention suitable for in situ DNA synthesis on an electrode microarray.

I claim:

1. A method for electrochemical deblocking of an acid-labile protecting group, comprising applying a voltage or a current to at least one anode of an array of electrodes electrically connected a counter cathode separate from the array of electrodes, wherein the array of electrodes is covered by a deblocking solution, wherein the deblocking solution comprises an organic solvent and:

(a) a salt, whereby the salt provides conductivity to the deblocking solution; and
(b) a hydrazine derivative, wherein the hydrazine derivative comprises at least one hydrazine group having at least one hydrogen atom attached to the at least one hydrazine group, wherein the hydrazine derivative provides an acidic electrochemically-generated reagent and substantially isolates the acidic reagent to a non-overlapping area surrounding the at least one electrode, whereby the electrochemical deblocking occurs when the acidic reagent removes at least one acid-labile protecting group of a chemical species attached to a reactive layer bound to the at least one electrode.

2. The method of claim 1, wherein the organic solvent is selected from the group consisting of 1,1,1-trichloroethane, 1,1,2-trichloro-1,2,2-trifluoroethane, 1,1,2-trichloroethane, 1,4-dichlorobenzene, 1-butanol, 1-hexene, 1-propanol, 2-(2-butoxyethoxy) ethyl acetate, 2-butoxyethanol acetate, 2-butoxyethyl acetate, 2-ethoxyethanol acetate, 2-ethoxyethanol, 2-methoxyethanol acetate, 2-methoxyethanol, 2-methylhexane, 2-nitropropane, acetic acid, acetone alcohol, acetone, acetonitrile, allyl alcohol, benzene, benzotrifluoride, benzyl chloride, biphenyl, carbon disulfide, carbon tetrachloride, chlorobenzene, chlorobromomethane, cyclodecane, cycloheptane, cyclohexane, cyclohexanol, cyclohexanone, cyclononane, cyclooctane, cyclopentane, diacetone alcohol, dibromomethane, dichlorodiphenyltrichloroethane, dichloroethene, diemthyl sulfoxide, diethanolamine, diethyl ether, diethylene glycol, dimethyl ethanolamine, dimethyl formamide, dipropylene glycol, ethanol, ethyl acetate, ethyl benzene, ethyl ether, ethyl glycol acetate, ethyl glycol, ethylbenzene, ethylene glycol, formamide, formic acid, furfural, furfuryl alcohol, heptafluorocyclopentane, heptafluoropropyl methyl ether, heptane, hexachlorocyclohexane, hexane, isoamyl alcohol, isobutyl acetate, isobutyl alcohol, isobutyl isobutyrate, isomethoxynonafluorobutane, iso-methoxynonafluorobutane, isophorone, isopropyl acetate, iso-propyl alcohol, isopropylamine-striazine, methanol, methoxy propyl acetate, methyl amyl ketone, methyl chloride, methyl chloroform, methyl ethyl ketone, methyl glycol acetate methyl isobutyl ketone, methyl propyl ketone, methylene chloride, monochlorotoluene, monothiophosphate, n-amyl alcohol, n-butyl acetate, n-butyl alcohol, n-decane, nitrobenzene, nitromethane, n-methoxynonafluorobutane, n-methylpyrrolidone, n-nonane, n-octane, n-octyl alcohol, n-butyl acetate, n-methoxynonafluorobutane, n-pentane, n-propyl acetate, n-propyl alcohol, ortho-dichlorobenzene, perchloroethene, perchloroethylene, propylene glycol diacetate, propylene glycol, pyridine, t-amyl alcohol, t-butyl alcohol, tetrachloroethylene, tetrahydrofuran, toluene, trans-1,2-dichloroethylene, trichloroethene, trichloroethylene, trichlorofluoromethane, triethanolamine, triethylene gycol, vinyl choloride, and xylene, and combinations thereof.

3. The method of claim 1, wherein the hydrazine derivative is selected from the group consisting of

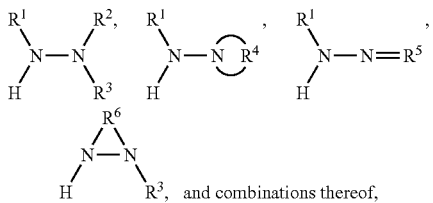

and combinations thereof, wherein
$R^1$, $R^2$, and $R^3$ are independently selected from the group consisting of hydrogen, and substituted and unsubstituted alkyl, alkenyl, alkynyl, cycloalkyl, cycloalkenyl, cycloalkynyl, aryl, heterocyclic ring, and polycyclic group, and halo, amide, alkoxy, acyl, acyloxy, oxycarbonyl, acyloxycarbonyl, alkoxycarbonyloxy, carboxy, amino, secondary amino, tertiary amino, hydrazino, azido, alkazoxy, cyano, isocyano, cyanato, isocyanato, thiocyanato, fulminato, isothiocyanato, isoselenocyanato, selenocyanato, carboxyamido, acylimino, nitroso, aminooxy, carboximidoyl, hydrazonoyl, oxime, acylhydrazino, amidino, sulfide, sulfoxide, thiosulfoxide, sulfone, thiosulfone, sulfate, thiosulfate, hydroxyl, formyl, hydroxyperoxy, hydroperoxy, peroxy acid, carbamoyl, trimethyl silyl, nitro, nitroso, oxamoyl, pentazolyl, sulfamoyl, sulfenamoyl, sulfeno, sulfinamoyl, sulfino, sulfo, sulfoamino, hydrothiol, tetrazolyl, thiocarbamoyl, thiocarbazono, thiocarbodiazono, thiocarbonohydrazido, thiocarboxy, thioformyl, thioacyl, thiocyanato, thiosemicarbazido, thiosulfino, thiosulfo, thioureido, triazano, triazeno, triazinyl, trithiosulfo, sulfinimidic acid, sulfonimidic acid, sulfinohydrazonic acid, sulfonohydrazonic acid, sulfinohydroximic acid, sulfonohydroximic acid, and phosphoric acid ester;
$R^4$ forming a ring incorporating one of the nitrogens of the hydrazine derivative and is selected from the group consisting of substituted and unsubstituted alkyl, alkenyl, alkynyl, cycloalkyl, cycloalkenyl, cycloalkynyl, aryl, heterocyclic ring, and polycyclic group;
$R^5$ forming a double bond with one of the nitrogens of the hydrazine derivative and is selected from the group consisting of substituted and unsubstituted alkyl, alkenyl, and alkynyl having a terminal group having two free radicals, and substituted and unsubstituted cycloalkyl, cycloalkenyl, heterocyclic ring, polycyclic group, and cycloalkynyl having two free radicals on one atom, and oxo, imino, hydrazono, acrylimino, diazo, hydrazono, hydroxyimino, alkoxyimino, aci-nitro, semicarbazono, and thiooxi; and
$R^6$ forming a ring incorporating two of the nitrogens of the hydrazine derivative and is selected from the group consisting of substituted and unsubstituted alkyl, alkenyl, alkynyl, cycloalkyl, cycloalkenyl, cycloalkynyl, aryl, heterocyclic ring, and polycyclic group.

4. The method of claim 1 wherein the array of electrodes has a reaction layer overlaying each electrode of the array.

5. The method of claim 1, wherein the salt is selected from the group consisting of 1,1-dibutyl-pyrrolidinium bis(trifluorbmethylsulfonyl)imide, 1,1-dimethyl-pyrrolidinium tris(pentafluoroethyl)trifluorophosphate, 1,1-dipropyl-pyrrolidinium bis(trifluoromethylsulfonyl)imide, 1,2-dimethyl-3-propylimidazolium bis(trifluoromethylsulfonyl)imide, 1,2-dimethyl-3-propylimidazolium tris(trifluoromethylsulfonyl) methide, 1,3-dimethyl-imidazolium bis(pentafluoroethyl) phosphinate, 1,3-dimethyl-imidazolium methyl sulfate, 1, 3-dimethyl-imidazolium trifluoromethanesulfonate, 1-benzyl-3-methyl-imidazolium hexafluoroantimonate, 1-benzyl-3-methyl-imidazolium hexafluorophosphate, 1-benzyl-3-methyl-imidazolium methylsulfate, 1-benzyl-3-methyl-imidazolium tetrafluoroborate, 1-benzyl-3-methyl-imidazolium trifluoromethanesulfonate, 1-butyl-1-methyl-pyrrolidinium bis(trifluoromethylsulfonyl)imide, 1-butyl-1-methyl-pyrrolidinium dicyanamide, 1-butyl -1-methyl-pyrrolidinium hexafluoroantimonate, 1-butyl-1-methyl-pyrrolidinium hexafluorophosphate, 1-butyl-1-methyl-pyrrolidinium methylsulfate, 1-butyl-1-methyl-pyrrolidinium tetracyanoborate, 1-butyl-1-methyl-pyrrolidinium tetrafluoroborate, 1-butyl-1-methyl-pyrrolidinium trifluoromethanesulfonate, 1-butyl-1-methyl-pyrrolidinium tris(pentafluoroethyl)trifluorophosphate, 1-butyl-2,3-dimethyl-imidazolium hexafluoroantimonate, 1-butyl-2,3-dimethyl-imidazolium hexafluorophosphate, 1-butyl-2, 3-dimethyl-imidazolium methylsulfate, 1-butyl-2,3-dimethyl-imidazolium tetrafluoroborate, 1-butyl-2,3-dimethyl-imidazolium tosylate, 1-butyl-2,3-dimethyl-imidazolium trifluoromethanesulfonate, 1-butyl-3-ethyl-imidazolium trifluoromethanesulfonate, 1-butyl-3-methyl-imidazolium 2-(2-methoxyethoxy)ethyl sulfate, 1-butyl-3-methyl-imidazolium bis(trifluoromethyl)imide, 1-butyl-3-methyl-imidazolium cobalt tetracarbonyl, 1-butyl-3-methyl -imidazolium dicyanamide, 1-butyl-3-methyl-imidazolium hexafluorophosphate, 1-butyl-3-methyl-imidazolium methyl sulfate, 1-butyl-3-methyl-imidazolium octylsulfate, 1-butyl-3-methyl-imidazolium tetrafluoroborate, 1-butyl-3-methyl-imidazolium tosylate, 1-butyl-3-methyl -imidazolium trifluoroacetate, 1-butyl-3-methyl-imidazolium trifluoromethane sulfonate, 1-butyl -3-methyl-pyridinium bis(trifluormethylsulfonyl)imide, 1-butyl-4-methyl-pyridinium hexafluorophosphate, 1-butyl-4-methyl-pyridinium tetrafluoroborate, 1-butyl-imidazolium hexafluorophosphate, 1-butyl-imidazolium tetrafluoroborate, 1-butyl-imidazolium tosylate, 1-butyl-imidazolium trifluoromethanesulfonate, 1-ethyl-1-methyl-pyrrolidinium bis(trifluoromethyl)imide, 1-ethyl-1-methyl-pyrrolidinium hexafluoroantimonate, 1-ethyl-1-methyl-pyrrolidinium hexafluorophosphate, 1-ethyl-1-methyl-pyrrolidinium methylsulfate, 1-ethyl-1-methyl-pyrrolidinium tetrafluoroborate, 1-ethyl-1-methyl-pyrrolidinium trifluoromethanesulfonate, 1-ethyl-2,3-dimethyl-imidazolium hexafllluoroantimonate, 1-ethyl -2,3-dimethyl-imidazolium hexaflluorophosphate, 1-ethyl-2,3-dimethyl-imidazolium methylsulfate, 1-ethyl-2,3-dimethyl-imidazolium tetrafluoroborate, 1-ethyl-2,3-dimethyl -imidazolium tosylate, 1-ethyl-2,3-dimethyl-imidazolium trifluoromethanesulfonate, 1-ethyl-3-methyl-imidazolium bis(pentafluoroethyl)phosphinate, 1-ethyl-3-methyl-imidazolium bis(pentafluoroethylsulfonyl)imide, 1-ethyl-3-methyl-imidazolium bis(trifluoromethyl)imide, 1-ethyl-3-methyl-imidazolium bis(trifluoromethylsulfonyl)imide, 1-ethyl-3-methyl-imidazolium bis[1,2-benzenediolato(2-)-O,O']-borate, 1-ethyl-3-methyl-imidazolium bis[oxalato (2-)]-borate, 1-ethyl-3-methyl-imidazolium cobalt tetracarbonyl, 1-ethyl-3-methyl-imidazolium dicyanamide, 1-ethyl-3-methyl-imidazolium hexafluoroantimonate, 1-ethyl-3-methyl-imidazolium hexafluorophosphate, 1-ethyl-3-methyl-imidazolium nitrate, 1-ethyl-3-methyl-imidazolium tetrafluoroborate, 1-ethyl-3-methyl-imidazolium tosylate, 1-ethyl-3-methyl-imidazolium trifluoroacetate, 1-ethyl-3-methyl-imidazolium trifluoromethanesulfonate, 1-ethyl-3-methyl -imidazolium trifluoromethyltrifluoroborate, 1-hexyl-1-methyl-pyrrolidinium bis(trifluoromethylsulfonyl)imide, 1-hexyl-1-methyl-pyrrolidinium dicyanamide, 1-hexyl-2,3-dimethyl-imidazolium tetrafluoroborate, 1-hexyl-2,3-dimethyl-imidazolium trifluoromethanesulfonate, 1-hexyl-3-methyl-imidazolium bis(trifluoromethylsulfonyl)imide, 1-hexyl-3-methyl-imidazolium bis(trifluoromethylsulfonyl)methane, 1-hexyl-3-methyl -imidazolium dicyanamide, 1-hexyl-3-methyl-imidazolium hexafluoroantimonate, 1-hexyl-3-methyl-imidazolium hexafluorophosphate, 1-hexyl-3-methyl-imidazolium methylsulfate, 1-hexyl-3-methyl-imidazolium tetracyanoborate, 1-hexyl-3-methyl-imidazolium tetrafluoroborate, 1-hexyl-3-methyl-imidazolium trifluoromethanesulfonate, 1-hexyl-3-methyl-imidazolium tris(heptafluoropropyl)trifluorophosphate, 1-hexyl-3-methyl-imidazolium tris(pentafluoroethyl)trifluorophosphate, 1-hexyl-3-methyl-imidazolium tris(pentafluoroethyl)trifluorophosphate, 1-methyl-3-(3,3,4,4,5,5,6,6,7,7,8,8,8-tridecafluoroctyl) -imidazolium-hexafluorophosphate, 1-methyl-3-octyl-imidazolium tetrafluoroborate, 1-methyl -imidazolium hexafluorophosphate, 1-methyl-imidazolium tetrafluoroborate, 1-methyl -imidazolium tosylate, 1-methyl-imidazolium trifluoromethanesulfonate, 1-octadecyl-3-methyl -imidazolium bis(trifluoromethylsulfonyl)imide, 1-octadecyl-3-methyl-imidazolium hexafluorophosphate, 1-octyl-1-methyl-pyrrolidinium bis(trifluoromethylsulfonyl)imide, 1-octyl -3-methyl-imidazolium bis(trifluoromethylsulfonyl)imide, 1-octyl-3-methyl-imidazolium bis(trifluoromethylsulfonyl)methane, 1-octyl-3-methyl-imidazolium hexafluoroantimonate, 1-octyl-3-methyl-imidazolium hexafluorophosphate, 1-octyl-3-methyl-imidazolium methylsulfate, 1-octyl-3-methyl-imidazolium tetrafluoroborate, 1-octyl-3-methyl-imidazolium trifluoromethanesulfonate, 1-pentyl-3-methyl-imidazolium trifluoromethanesulfonate, 1-pentyl -3-methyl-imidazolium tris(nonafluorobutyl)trifluorophosphate, 1-pentyl-3-methyl-imidazolium tris(pentafluoroethyl)trifluorophosphate, 1-phenylpropyl-3-methyl-imidazolium hexafluoroantimonate, 1-phenylpropyl-3-methyl-imidazolium hexafluorophosphate, 1-phenylpropyl-3-methyl-imidazolium tetrafluoroborate, 1-phenylpropyl-3-methyl-imidazolium trifluoromethanesulfonate, 1-tetradecyl-3-methyl-imidazolium tetrafluoroborate, 3-ethyl-N -butyl-pyridinium hexafluoroantimonate, 3-ethyl-N-butyl-pyridinium hexafluorophosphate, 3-ethyl-N-butyl-pyridinium tetrafluoroborate, 3-ethyl-N-butyl-pyridinium trifluoromethanesulfonate, 3-methyl-1-propyl-pyridinium bis(trifluormethylsulfonyl)imide, 3-methyl-N-butyl-pyridinium hexafluoroantimonate, 3-methyl-N-butyl-pyridinium hexafluorophosphate, 3-methyl-N-butyl-pyridinium methylsulfate, 3-methyl-N-butyl-pyridinium tetrafluoroborate, 3-methyl-N-butyl-pyridinium trifluoromethanesulfonate, 4-methyl-N-butyl -pyridinium hexafluorophosphate, 4-methyl-N-butyl-pyridinium tetrafluoroborate, benzyl triphenyl-phosphoniumbis(trifluoromethyl)imide, bis(trifluoromethylsulfonyl)imide, bis-tetramethyl ammonium oxalate, butyl dimethyl imidazolium hexafluorophosphate, butyl methyl imidazolium hexafluorophosphate, dimethyl diethyl ammonium hydroxide, dimethyl distearyl ammonium bisulfate, dimethyl distearyl ammonium methosulfate, ethyl triphenyl phosphonium acetate, guanidinium trifluoromethanesulfonate, guanidinium tris(pentafluoroethyl) Trifluorophosphate, hexamethyl-guanidinium trifluoromethanesulfonate, hexamethyl -guanidinium tris(pentafluoroethyl) trifluorophosphate, methyl tributyl ammonium hydrogen sulfate, methyl triethyl ammonium hydroxide, methyl trioctyl ammonium bis(trifluoromethylsulfonyl)imide, N,N,N',N',N''-pentamethyl-N'''-isopropyl-guanidinium trifluoromethanesulfonate, N,N,N',N',N''-pentamethyl-N'''-isopropyl-guanidinium tris(pentafluoroethyl) trifluorophosphate, N,N,N',N',N''-pentamethyl-N'''-propyl-guanidinium trifluoromethanesulfonate, N,N,N',N',N''-pentamethyl-N'''-propyl-guanidinium tris(pentafluoroethyl) trifluorophosphate, N,N,N',N'-tetramethyl-N''-ethyl-guanidinium trifluoromethanesulfonate, N,N,N',N'-tetramethyl-N''-ethyl-guanidinium tris(pentafluoroethyl) trifluorophosphate, N-butyl-pyridinium bis(trifluoromethyl)imide, N-butyl-pyridinium hexafluoroantimonate, N-butyl-pyridinium hexafluorophosphate, N-butyl-pyridinium methylsulfate, N-butyl-pyridinium tetrafluoroborate, N-butyl-pyridinium trifluoromethanesulfonate, N-hexyl-pyridinium bis(trifluoromethylsulfonyl)imide, N-hexyl -pyridinium bis(trifluoromethylsulfonyl)methane, N-hexyl-pyridinium hexafluorophosphate, N -hexyl-pyridinium tetrafluoroborate, N-hexyl-pyridinium trifluoromethanesulfonate, N-octyl -pyridinium bis(trifluoromethylsulfonyl)imide, N-octyl-pyridinium tris (trifluoromethylsulfonyl)methane, O-ethyl-N,N,N',N'-tetramethyl-isouronium trifluoromethanesulfonate, O-ethyl-N,N,N',N'-tetramethyl-isouronium tris(pentafluoroethyl) trifluorophosphate, O-methyl-N,N,N',N'-tetramethyl-isouronium trifluoromethanesulfonate, O-methyl-N,N,N',N'-tetramethyl-isouronium tris(pentafluoroethyl) trifluorophosphate, S-ethyl -N,N,N',N'-tetramethyl isothiouronium trifluoromethanesulfonate, S-ethyl-N,N,N',N'-tetramethylisothiouronium tris(pentafluoroethyl) trifluorophosphate, S-ethyl-N,N,N',N'-tetramethylthiouronium tetrafluoroborate, tetrabutyl ammonium bis(trifluoromethyl)imide, tetrabutyl ammonium bis(trifluoromethylsulfonyl)imide, tetrabutyl ammonium borohydride, tetrabutyl ammonium hydrogen sulfate, tetrabutyl ammonium hexafluorophosphate, tetrabutyl ammonium hydroxide, tetrabutyl ammonium nitrate, tetrabutyl ammonium perchlorate, tetrabutyl ammonium sulfate, tetrabutyl ammonium tetracyanoborate, tetrabutyl ammonium tetrafluoroborate, tetrabutyl ammonium tris(pentafluoroethyl)trifluorophosphate, tetrabutyl phosphonium acetate, tetrabutyl phosphonium bis(trifluoromethyl)imide, tetrabutyl phosphonium bis[1,2-benzenediolato(2-)-O,O']-borate, tetrabutyl phosphonium bis[oxalato(2-)]-borate, tetrabutyl phosphonium Hydroxide, tetrabutyl phosphonium tetracyanoborate, tetrabutyl phosphonium tris(pentafluoroethyl)trifluorophosphate, tetraethyl ammonium bis(trifluoromethyl)imide, tetraethyl ammonium bis(trifluoromethylsulfonyl)imide, tetraethyl ammonium bis[1,2-benzenediolato(2-)-O,O']-borate, tetraethyl ammonium bis[2,2'-biphenyldiolato(2-)-O,O']-borate, tetraethyl ammonium bis[malonato(2-)]-borate, tetraethyl ammonium bis[salicylato(2-)]-borate, tetraethyl ammonium hexafluorophosphate, tetraethyl ammonium hydrogen maleate, tetraethyl ammonium hydroxide, tetraethyl ammonium tetrafluoroborate, tetraethyl ammonium tosylate, tetraethyl ammonium tris(pentafluoroethyl)trifluorophosphate, tetramethyl ammonium bis(trifluoromethyl)imide, tetramethyl ammonium bis(trifluoromethylsulfonyl)imide, tetramethyl ammonium bis[oxalato (2-)]-borate, tetramethyl ammonium bis[salicylato(2-)]borate, tetramethyl ammonium hexafluorophosphate, tetramethyl ammonium hydrogenphthalate, tetramethyl ammonium hydroxide, tetramethyl ammonium tetrafluoroborate, tetramethyl ammonium tris(pentafluoroethyl)trifluorophosphate, tetrapropyl ammonium hydroxide, tributylethyl ammonium ethylsulfate, trihexyl(tetradecyl)-phosphonium bis(2,4,4-trimethylpentyl) phosphinate, trihexyl(tetradecyl)-phosphonium bis(trifluoromethylsulfonyl)imide, trihexyl(tetradecyl)-phosphonium bis(trifluoromethylsulfonyl)methane, trihexyl(tetradecyl)-phosphonium bis[1,2-benzenediolato(2-)-O,O']-borate, trihexyl(tetradecyl)-phosphonium decanoate, trihexyl(tetradecyl)-phosphonium dicyanamide, trihexyl(tetradecyl)-phosphonium hexafluorophosphate, trihexyl(tetradecyl)-phosphonium tetracyanoborate, trihexyl(tetradecyl)-phosphonium tetrafluoroborate, trihexyl(tetradecyl)-phosphonium, tris(pentafluoroethyl)trifluorophosphate, and tri-iso-butyl(methyl)-phosphonium tosylate, and combinations thereof.

6. The method of claim 1, wherein the acid-labile protecting group is selected from the group consisting of t-butyloxycarbonyl, benzyloxycarbonyl, dimethoxytrityl, tert -butyloxycarbonyl, tert-amyloxycarbonyl, adamantyloxycarbonyl, 1-methylcyclobutyloxycarbonyl, 2-(p-biphenyl)propyl(2)oxycarbonyl, 2-(p-phenylazophenyl)propyl(2)oxycarbonyl, alpha,alpha-dimethyl-3,5 -dimethyloxybenzyloxy-carbonyl, 2-phenylpropyl(2)oxycarbonyl, 4-methyloxybenzyloxycarbonyl, benzyloxycarbonyl, furfuryloxycarbonyl, triphenylmethyl(trityl), p-toluenesulfenylaminocarbonyl, dimethylphosphinothioyl, diphenylphosphinothioyl, 2-benzoyl -1-methylvinyl, o-nitrophenylsulfenyl, trimethylsilyl, triethylsilyl, t-butyldimethylsilyl, dimethoxytrityl, methoxytrityl, phthaloyl, tert-butyl ester, dimethyltrityl, hexadienyloxycarbonyl, and 1-naphthylidene.

7. The method of claim 1, wherein the hydrazine derivative has a concentration from about 0.01 to about 200 grams per liter.

8. The method of claim 1, wherein the hydrazine derivative is 1, 2-diphenylhydrazine having a concentration from about 0.01 to about 200 grams per liter.

9. The method of claim 1, wherein the salt has a concentration from about 0.01 g/l to about 400 grams per liter.

10. The method of claim 1, wherein the salt is tetrabutylammonium hexafluorophosphate having a concentration from about 0.01 g/l to about 400 grams per liter.

11. The method of claim 1, wherein the voltage is from approximately 0.1 volts to approximately 10 volts.

\* \* \* \* \*